United States Patent [19]
Ohkuma et al.

[11] Patent Number: 5,845,041
[45] Date of Patent: Dec. 1, 1998

[54] VIDEO SIGNAL RECORDING AND REPRODUCING APPARATUS WITH HIGH EFFICIENCY ENCODING

[75] Inventors: Ikuo Ohkuma; Sadayuki Inoue; Tohru Inoue; Yoshinori Asamura; Kimitoshi Hongo, all of Nagaokakyo, Japan

[73] Assignee: Mitsubishi Denki Kabushiki Kaisha, Tokyo, Japan

[21] Appl. No.: 327,815

[22] Filed: Oct. 17, 1994

Related U.S. Application Data

[63] Continuation of Ser. No. 975,107, Nov. 12, 1992, abandoned.

[30] Foreign Application Priority Data

Nov. 12, 1991 [JP] Japan .................................. 3-294748
Nov. 14, 1991 [JP] Japan .................................. 3-298852

[51] Int. Cl.$^6$ .............................. H04N 5/91; H04N 5/917
[52] U.S. Cl. ............................................ 386/68; 386/109
[58] Field of Search ........................................ 358/312, 313, 358/330, 335; 348/342, 384, 395, 398, 403; 360/10.1, 10.3, 11.1, 32, 73.1; 386/109, 111, 68, 192, 33, 22; H04N 5/91, 5/917

[56] References Cited

U.S. PATENT DOCUMENTS

| | | | |
|---|---|---|---|
| 5,068,744 | 11/1991 | Ito | 358/310 |
| 5,073,821 | 12/1991 | Juri | 358/133 |
| 5,136,391 | 8/1992 | Minami | 358/310 |
| 5,239,308 | 8/1993 | Keesen | 341/67 |
| 5,371,602 | 12/1994 | Tsuboi et al. | 358/335 |

*Primary Examiner*—Robert Chevalier

[57] ABSTRACT

A video signal recording and reproducing apparatus for recording a video signal whose information amount is compressed using a high-efficiency encoding employing an orthogonal transform, wherein encoded data obtained by encoding only low-frequency coefficients are recorded separately from normal encoded data. When the amount of information after compression falls short of a presdetermined amount available for recording, the encoded data of low-frequency coefficients are added to fill the vacancy. For the low-frequency coefficients, check words are appended that which provide a greater minimum distance compared with other coefficients. The low-frequency coefficients are doubly encoded for error-correction.

26 Claims, 40 Drawing Sheets

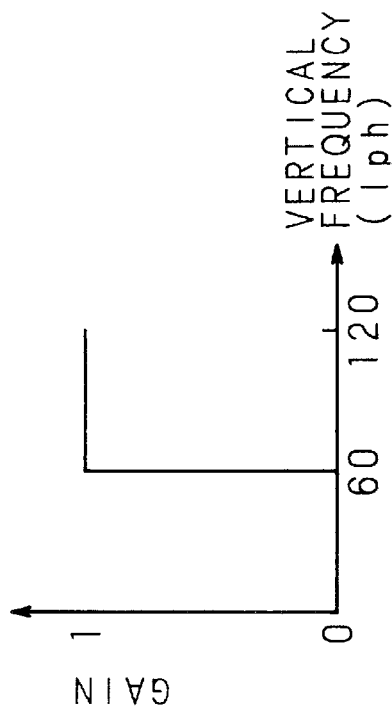
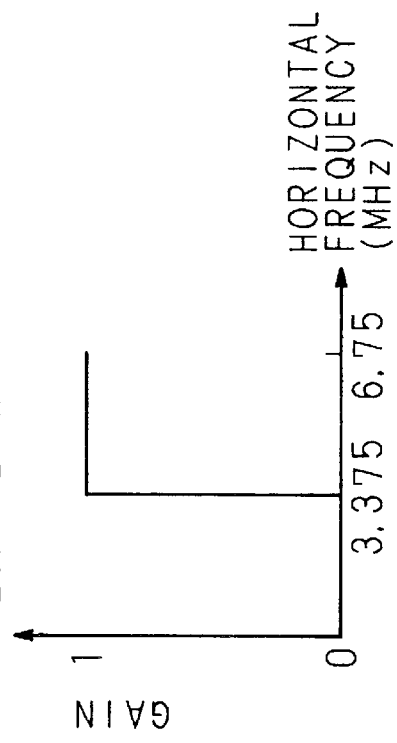
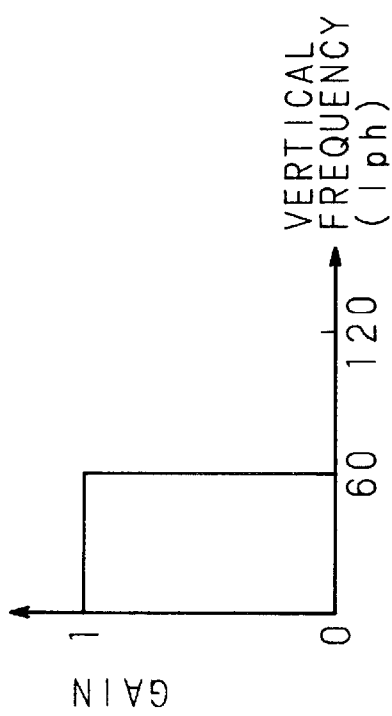
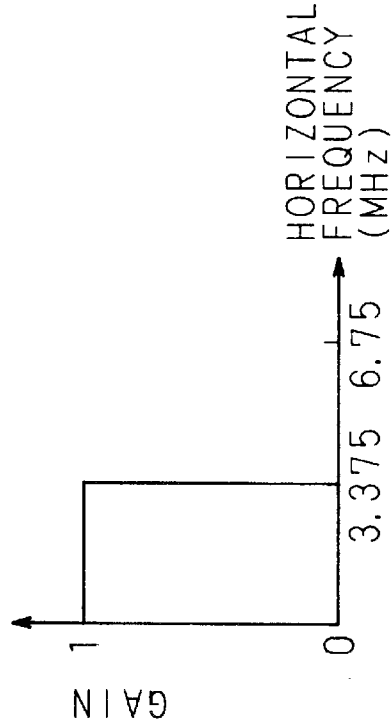

Fig. 5
Prior Art

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 2 | 23 | 24 | 25 | 26 | 27 | 28 | 29 | 30 | 31 | 32 | 33 | 34 | 35 | 36 | 37 | 38 | 39 | 40 | 41 | 42 | 43 | 44 |
| 3 | 45 | 46 | 47 | 48 | 49 | 50 | 51 | 52 | 53 | 54 | 55 | 56 | 57 | 58 | 59 | 60 | 61 | 62 | 63 | 64 | 65 | 66 |
| 4 | 67 | 68 | | | | | | | | | | | | | | | | | | | | 88 |
| 5 | 89 | 90 | | | | | | | | | | | | | | | | | | | 87 | |
| 6 | 111 | 112 | | | | | | | | | | | | | | | | | | | 109 | 110 |
| 7 | 133 | 134 | | | | | | | | | | | | | | | | | | | 131 | 132 |
| 8 | 155 | 156 | | | | | | | | | | | | | | | | | | | 153 | 154 |
| 9 | 177 | 178 | | | | | | | | | | | | | | | | | | | 175 | 176 |
| 10 | 199 | 200 | | | | | | | | | | | | | | | | | | | 197 | 198 |
| 11 | 221 | 222 | | | | | | | | | | | | | | | | | | | 219 | 220 |
| 12 | 243 | 244 | | | | | | | | | | | | | | | | | | | 241 | 242 |
| 13 | 265 | 266 | 267 | 268 | 269 | 270 | 271 | 272 | 273 | 274 | 275 | 276 | 277 | 278 | 279 | 280 | 281 | 282 | 283 | 284 | 263 | 264 |
| 14 | 287 | 288 | 289 | 290 | 291 | 292 | 293 | 294 | 295 | 296 | 297 | 298 | 299 | 300 | 301 | 302 | 303 | 304 | 305 | 306 | 285 | 286 |
| 15 | 309 | 310 | 311 | 312 | 313 | 314 | 315 | 316 | 317 | 318 | 319 | 320 | 321 | 322 | 323 | 324 | 325 | 326 | 327 | 328 | 307 | 308 |

HORIZONTAL DIRECTION →

VERTICAL DIRECTION →

Fig. 7
Prior Art

| TRACK NUMBER | NUMBER OF BLOCKS | WHOLE AREA OF SCREEN | | | | | | | | | | | | | | | | | | | | |
|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 |
| 1 | 21 | | | | | | | | | | | | | | | | | | | | | |
| 2 | 21 | | | | | | | | | | | | | | | | | | | | | |
| 3 | 21 | | | | | | | | | | | | | | | | | | | | | |
| 4 | 20 | | | | | | | | | | | | | | | | | | | | | |
| 5 | 21 | | | | | | | | | | | | | | | | | | | | | |
| 6 | 20 | | | | | | | | | | | | | | | | | | | | | |
| 7 | 21 | | | | | | | | | | | | | | | | | | | | | |
| 8 | 20 | | | | | | | | | | | | | | | | | | | | | |
| 9 | 21 | | | | | | | | | | | | | | | | | | | | | |
| 10 | 21 | | | | | | | | | | | | | | | | | | | | | |
| 11 | 21 | | | | | | | | | | | | | | | | | | | | | |
| 12 | 20 | | | | | | | | | | | | | | | | | | | | | |
| 13 | 21 | | | | | | | | | | | | | | | | | | | | | |
| 14 | 20 | | | | | | | | | | | | | | | | | | | | | |
| 15 | 21 | | | | | | | | | | | | | | | | | | | | | |
| 16 | 20 | | | | | | | | | | | | | | | | | | | | | |

Fig. 9
Prior Art (a) DIGITAL VIDEO SIGNAL  (b)
    FOR ONE FIELD

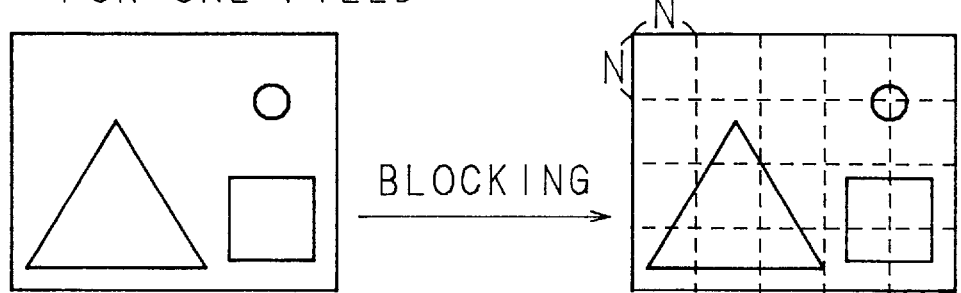

BLOCKING (c) COEFFICIENTS AFTER
    ORTHOGONAL TRANSFORM $F_{11} F_{12} \cdots F_{1N}$
$F_{21} F_{22} \cdots F_{2N}$
$\vdots \quad \vdots \quad \quad \vdots$
$F_{N1} F_{N2} \cdots F_{NN}$

ORTHOGONAL TRANSFORM

↓ ADAPTIVE QUANTIZATION (d) ADAPTIVE-QUANTIZED COEFFICIENTS $D_{11} D_{12} \cdots D_{1N}$
$D_{21} D_{22} \cdots D_{2N}$
$\vdots \quad \vdots \quad \quad \vdots$
$D_{N1} D_{N2} \cdots D_{NN}$

↓ PARALLEL/SERIAL CONVERSION (e)
$D_{11} D_{12} \cdots D_{1N} D_{21} D_{22} \cdots D_{2N} \cdots D_{N1} D_{N2} \cdots D_{NN}$

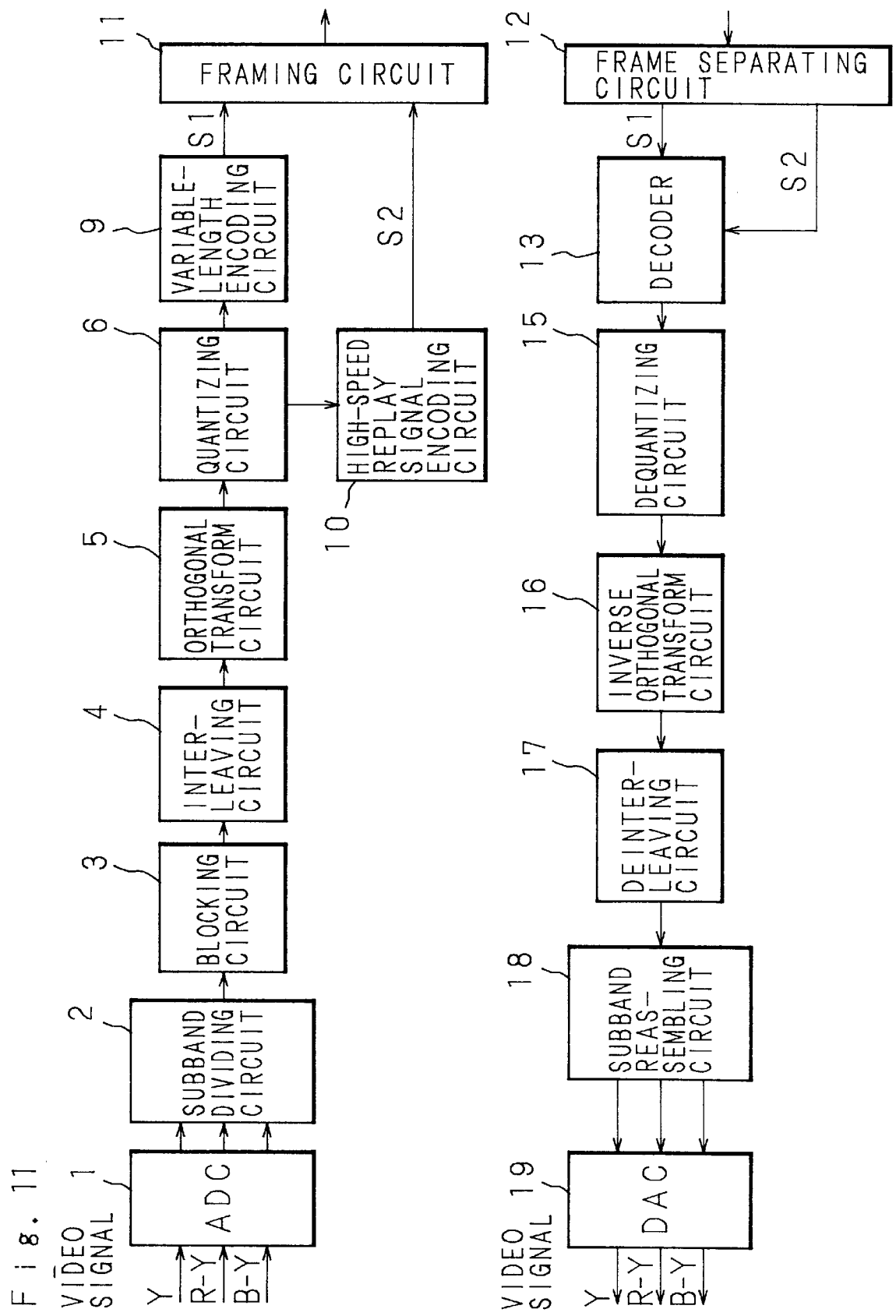

DIGITAL VIDEO SIGNAL
FOR ONE FIELD AFTER BLOCKING

VIDEO SIGNAL RECORDING AND REPRODUCING APPARATUS WITH HIGH EFFICIENCY ENCODING

This application is a continuation of application Ser. No. 07/975,107 filed on Nov. 12, 1992, now abandoned.

BACKGROUND OF THE INVENTION

1. Field of the Invention

The present invention relates to a video signal recording and reproducing apparatus for recording a digital video signal on a recording medium after reducing the amount of information by use of high-efficiency encoding and for reproducing the recorded video data from the recording medium.

2. Description of Related Art

FIG. 1 is a block diagram showing the configuration of a prior art video signal recording and reproducing apparatus. In the diagram, the reference numeral 1 designates an analog/digital converter (hereinafter referred to as the ADC) which converts analog video input signals (containing the luminance signal (Y signal) and color-difference signals (R-Y and B-Y signals)) into digital signals. The digitized video signals are each divided by a subband dividing circuit 2 into four subbands according to the frequency, which are then supplied to a blocking circuit 3. In the blocking circuit 3, each subband signal supplied from the subband dividing circuit 2 is arranged into three-dimensional blocks which are sequentially supplied to an interleaving circuit 4 as well as to a moving image/static image identifying circuit 7. The interleaving circuit 4 rearranges the three-dimensional blocks and supplies the rearranged blocks to an orthogonal transform circuit 5. The orthogonal transform circuit 5 performs a three-dimensional orthogonal transform on each block to obtain orthogonal coefficients (hereinafter simply referred to as the coefficients); the coefficients are supplied to a quantizing circuit 6 as well as to a quantization parameter setting circuit 8. The moving image/static image identifying circuit 7 identifies each block as a moving image or a static image block, and supplies the identification result to the quantization parameter setting circuit 8. Based on the identification result, the coefficients from the orthogonal transform circuit 5, etc., the quantization parameter setting circuit 8 sets a quantization parameter which is supplied to the quantizing circuit 6. The quantizing circuit 6 quantizes each coefficient, supplied from the orthogonal transform circuit 5, in accordance with the quantization parameter set by the quantization parameter setting circuit 8, and transfers the quantized coefficients to a variable-length encoding circuit 9. The variable-length encoding circuit 9 encodes the output of the quantizing circuit 6 into a variable-length code which is outputted for recording on a recording medium.

The configuration of the reproducing system of the above apparatus will now be described below. The reference numeral 14 designates a variable-length decoding circuit for decoding variable-length encoded data recorded on the recording medium. The variable-length decoding circuit 14 reverses the transform process performed by the variable-length encoding circuit 9, and transfers the decoded data to a dequantizing circuit 15. The dequantizing circuit 15 expands the output of the variable-length decoding circuit 14 in accordance with the quantization parameter; the thus dequantized coefficients are supplied to an inverse orthogonal transform circuit 16. The inverse orthogonal transform circuit 16 performs an inverse orthogonal transform on the output of the dequantizing circuit 15 and supplies the result to a deinterleaving circuit 17. The deinterleaving circuit 17 rearranges the blocks back into the original order and supplies the rearranged blocks to a subband reassembling circuit 18. The subband reassembling circuit 18 reassembles the components supplied from the deinterleaving circuit 17 and feeds the reassembled data to a digital/analog converter (hereinafter referred to as the DAC) 19. The DAC 19 converts the digital video signals supplied from the subband reassembling circuit 18 back into the original analog video signals.

FIG. 2 is a block diagram showing the internal configuration of the subband dividing circuit 2. In the diagram, the reference numerals 20, 27, and 28 respectively designate a Y signal subband dividing circuit, an R-Y signal subband dividing circuit, and a B-Y signal subband dividing circuit, to which the Y, R-Y, and B-Y signals are respectively inputted from the ADC 1. All of the dividing circuits 20, 27, and 28 have the same internal configuration. FIG. 2 shows the internal configuration only of the Y signal subband dividing circuit 20. The Y signal subband dividing circuit 20 has: a vertical low-pass filter (vertical LPF) 21; a vertical high-pass filter (vertical HPF) 22; vertical 2:1 subsampling circuits 23a, 23b which respectively sample the outputs of the vertical LPF 21 and the vertical HPF 22 in such a manner as to halve the number of pixels in the vertical direction; horizontal low-pass filters (horizontal LPFs) 24a, 24b; horizontal high-pass filters (horizontal HPFs) 25a, 25b; and horizontal 2:1 subsampling circuits 26a, 26b, 26c, and 26d which respectively sample the outputs of the horizontal LPF 24a, horizontal HPF 25a, horizontal LPF 24b, and horizontal HPF 25b in such a manner as to halve the number of pixels in the horizontal direction.

The operation of the above apparatus will now be described.

Generally, when compressing the video signal, the luminance signal and the chrominance signal are often treated separately. Therefore, the video signal is split into the luminance signal (Y signal) and the color-difference signals (R-Y and B-Y signals), which are inputted to the ADC 1 for conversion into digital video signals. Here, it is assumed that the sampling frequency is 13.5 MHz for the luminance signal, and 6.75 Hz for the color-difference signals, with the effective screen per field being 704 pixels×240 horizontal lines and 352 pixels×240 horizontal lines, respectively. In the subband dividing circuit 2, the digitized signals for one field are each divided into four frequency bands (subbands), for example, LL, HL, LH, and HH as shown in FIG. 3(a) or (b).

The operation of the subband dividing circuit 2 will now be described with reference to FIG. 2. The Y signal that is inputted is divided into four bands by the Y signal subband dividing circuit 20. That is, the Y signal that is inputted to the Y signal subband dividing circuit 20 is band-limited by the vertical LPF 21 having the frequency characteristic as shown in FIG. 4(a), after which the number of pixels in the vertical direction is reduced to ½ by the vertical 2:1 subsampling circuit 23a. The output of the vertical 2:1 subsampling circuit 23a is then passed through the horizontal LPF 24a having the frequency characteristic as shown in FIG. 4(c), so that the number of pixels in the horizontal direction is reduced to ½ by the horizontal 2:1 subsampling circuit 26a. The output of the horizontal 2:1 subsampling circuit 26a is the signal representing the band LL shown in FIG. 3(a), the number of pixels now being reduced to ¼ as compared with the original input signal. The output of the vertical 2:1 subsampling circuit 23a is also inputted to the horizontal HPF 25a having the frequency characteristic as shown in FIG. 4(d), so that the number of pixels in the horizontal direction is reduced to ½ by the horizontal 2:1 subsampling circuit 26b. The output of the horizontal 2:1 subsampling circuit 26b is the signal representing the HL band shown in FIG. 3(a), the number of pixels now being reduced to ¼ as compared with the original input signal. The Y signal is also inputted to the vertical HPF 22 having the frequency characteristic as shown in FIG. 4(c). The output of the vertical HPF 22 is fed to the vertical 2:1 subsampling circuit 23b where the number of pixels in the vertical direction is reduced to ½. The output of the vertical 2:1 subsampling circuit 23b is band-limited through the horizontal LPF 24b having the frequency characteristic as shown in FIG. 4(c), after which the number of pixels in the horizontal direction is reduced to ½ by the horizontal 2:1 subsampling circuit 26c. The output of the horizontal 2:1 subsampling circuit 26c is the signal representing the LH band shown in FIG. 3(a), the number of pixels now being reduced to ¼ as compared with the original input signal. The output of the vertical 2:1 subsampling circuit 23b is also inputted to the horizontal HPF 25b having the frequency characteristic as shown in FIG. 4(d), so that the number pixels in the horizontal direction is reduced to ½ by the horizontal 2:1 subsampling circuit 26d. The output of the horizontal subsampling circuit 26d is the signal representing the HH band shown in FIG. 3(a), the number of pixels now being reduced to ¼ as compared with the original input signal.

Thus, in the Y signal subband dividing circuit 20, the Y signal is divided into the four bands, LL, HL, LH, and HH, which are outputted as separate subbands.

On the other hand, the R-Y signal that is inputted is divided by the R-Y signal subband dividing circuit 27 into the four bands, LL, HL, LH, and HH, shown in FIG. 3(b). Likewise, the B-Y signal that is inputted is divided by the B-Y signal subband dividing circuit 28 into the four bands, LL, HL, LH, and HH, shown in FIG. 3(b). The R-Y signal subband dividing circuit 27 and the B-Y signal subband dividing circuit 28 both operate in the same manner as the Y signal subband dividing circuit 20 described above.

The Y, R-Y, and B-Y signals, divided into subbands, are each divided by the blocking circuit 3 into a number of blocks of the size that is suitable for the orthogonal transform carried out by the orthogonal transform circuit 5. For example, if the Y signal is divided into blocks of 8 pixels (horizontal)×2×8 lines (vertical) and the R-Y and B-Y signals into blocks of 8 pixels (horizontal)×8 lines (vertical), the entire field is divided into a total of 330 blocks, i.e. 22 blocks (horizontal)×15 blocks (vertical), as shown in FIG. 5. The Y, R-Y, and B-Y signals thus divided into subbands and then into blocks are referred to as the two-dimensional subband blocks of the respective signals. The thus constructed two-dimensional subband blocks are stored for eight fields and organized into three-dimensional subband blocks each including of 8 pixels (horizontal)×8 lines (vertical)×8 fields and thus having a horizontal axis, a vertical axis, and a time axis.

These three-dimensional subband blocks are rearranged in the interleaving circuit 4 in such a manner that the blocks initially neighboring each other do not neighbor each other wherever possible in order to disperse the risk of signal loss that may occur during transmission. The rearranged subband blocks are then transferred to the orthogonal transform circuit 5 where each subband block is subjected to a three-dimensional discrete cosine transform (DCT), a form of transform coding, for conversion into DCT coefficients. The DCT coefficients obtained from each three-dimensional subband block are quantized by the quantizing circuit 6 with the quantization condition that matches the information amount of the block, to equalize the amount of information throughout.

FIG. 6 shows the power distribution of DCT coefficients along the time axis. FIG. 6(a) shows the power distribution in the case of a moving image, from which it can be seen that each coefficient has power, indicating that the amount of information is large. FIG. 6(b) shows the power distribution in the case of a static image, from which it can be seen that the even-numbered coefficients, except the zeroth one (DC component), are 0, and also that the power of each of the odd-numbered coefficients is small, indicating that the amount of information is small. Basically, in the case of a static image, no information change should occur along the time axis, but since the NTSC television signal is interlaced to form one picture (one frame) with two fields, spatial displacement is converted to time displacement as a result of the interlaced scanning, so that power appears in the odd-numbered coefficients. This is related to the degree of the base vector of the DCT.

For example, when a DCT coefficient (11 bits) whose quantization level is equivalent to 10.5 bits is multiplied by a quantization coefficient ½, a quantization level equivalent to 9.5 bits is obtained, and when it is multiplied by the square root of 2, a quantization level equivalent to 11.0 bits is obtained. In the case of a static image, since the information amount is small, the quantization coefficient is made large to allow transmission of as much information as possible so that detail image information can be transmitted. On the other hand, in the case of a moving image, since the information amount is large, it may not be possible to transmit all the information; therefore, the quantization coefficient is made small, dropping the information pertaining to detail image portions to reduce the overall information amount. In some cases, of the bands LL, LH, HL, and HH, shown in FIG. 3, which are obtained as a result of subband division, the quantization coefficient for the components of the HH band or the LH and HL bands may be made zero (subband elimination). Since the human eye is less sensitive to a moving image, such quantization is effective in reality. The quantization parameter such as the quantization coefficient used in the quantizing circuit 6, the quantization parameter for the elimination of high frequency components of the subbands, etc. is determined by the quantization parameter setting circuit 8, on the basis of the identification result that the moving image/static image identifying circuit 7 produces on each subband block by using the inter-frame correlation of the LL band components in the subband blocks supplied from the blocking circuit 3, or on the basis of the power of the even-numbered DCT coefficients obtained from the orthogonal transform circuit 5. The quantization parameter setting is also made on the basis of the information amount of each subband or DCT coefficient.

Each DCT coefficient quantized by the quantizing circuit 6 is variable-length encoded by the variable-length encoding circuit 9, using Huffman encoding or another method, to compress the amount of information. In the case of a digital video tape recorder, for example, the variable-length encoded DCT coefficients of 330 image blocks are assigned to 16 recording tracks, as shown in FIG. 7, each track being the unit of transmission. Therefore, the quantization parameter must be set so that each of the recording tracks can record all the variable-length codes of designated image blocks.

The reproducing system (decoding side) operates by reversing the above-described process of the recording system (encoding side). That is, the data encoded as described above is inputted to the variable-length decoding circuit 14 for decoding, and the decoded data is dequantized by the dequantizing circuit 15 for reconstruction into the original three-dimensional DCT coefficients. The three-dimensional DCT coefficients are then inverse-DCTed by the inverse orthogonal transform circuit 16 for reconstruction into the original subband blocks. The thus reconstructed subband blocks are rearranged by the deinterleaving circuit 17 back into the original order and reassembled together by the subband reassembling circuit 18 to reconstruct the digital video signals. Then, the DAC 19 converts the digital video signals to analog signals, thus reproducing the original video signals.

In the prior art video signal recording and reproducing apparatus of the above configuration, image data for several fields is variable-length encoded block by block for recording on the recording tracks. Since only part of the image data recorded on the recording tracks can be reproduced when playing back at high speed, the problem is that the reproduced image is not recognizable when played back at an extremely fast speed.

If a video signal is quantized directly, the amount of information becomes very large, and if the digitized video signal is directly recorded, it consumes a large amount of tape. To overcome this problem, various techniques have been employed to compress the information amount of video signal. Among such techniques, there is known a technique in which the information amount of video signal is compressed by first orthogonal-transforming the video signal and then encoding each of the resulting coefficients with a bit allocation that matches the power concentration.

An example of a technique for compressing the information amount of video signal by using such orthogonal transform is disclosed in "Image Coding Algorithm II—Transform Coding", Television Society Magazine, Vol. 43, No. 10 (1989), pp. 1145–1155. FIG. 8 is a block diagram showing the configuration of the apparatus disclosed therein.

In FIG. 8, the reference numeral 51 designates a blocking circuit which divides the input digital video signal into blocks each consisting of N pixels (N is an integer) in both the horizontal and vertical directions and supplies the blocks to an orthogonal transform circuit 52. The orthogonal transform circuit 52 performs an orthogonal transform on each block, and supplies the resulting coefficients to an adaptive quantizing circuit 53. The adaptive quantizing circuit 53 quantizes each coefficient with a predetermined bit allocation, and transfers the quantized coefficients in parallel to a parallel/serial converting circuit 54. The parallel/serial converting circuit 54 converts the coefficients into serial form to transfer serially to an error-correction code appending circuit 55. The error-correction code appending circuit 55 forms an information word by arranging the serial-converted coefficients in a matrix of k1 words (row)×k2 words (column), C2-encodes the information word in column direction, appends a C2 check word to, C1-encodes the information word and C2 check word in row direction, and appends a C1 check word. The resulting data is supplied to a sync-ID appending circuit 56 which appends a synchronizing signal and an ID signal to the information word before outputting onto a tape as a recording medium.

The operation of the above apparatus will now be described. FIGS. 9 and 10 are diagrams illustrating the operation sequence. First, the input digital video signal for one field (FIG. 9(a)) is divided by the blocking circuit 51 into blocks each consisting of N pixels in both the horizontal and vertical directions (FIG. 9(b)), the blocks then being supplied one by one to the orthogonal transform circuit 52. The orthogonal transform circuit 52 performs an orthogonal transform on each block to obtain coefficients (FIG. 9(c)). Generally, the power distribution in each block varies in a depending relationship on the locality of the video signal, and it is known that the power distribution tends to concentrate in the low frequency range. One known technique that utilizes this property for adaptive quantization of coefficients involves classifying the blocks into a number of classes according to the AC component power, excluding the DC component, of each block, and allocating different numbers of quantization levels to the various frequency components of the block according to the determined class, a larger number of quantization levels being assigned to a lower frequency component and a smaller number of quantization levels to a higher frequency component. Based on this technique, the adaptive quantizing circuit 53 determines the class of each block by the total sum of its AC component power, and encodes each coefficient (FIG. 9(d)) with the number of quantization levels based on the determined class; the information amount of the video signal is thus compressed. The parallel/serial converting circuit 54 converts the adaptive-quantized coefficients, along with a coefficient for identifying the class of the block, into serial form (FIG. 9(e)).

The adaptive-quantized coefficients for one field are arranged in a matrix of k1×k2 words to form an information word (FIG. 10(a)). The information amount of the compressed video signal varies from image to image, but since k1 and k2 are fixed in length, the word count (information amount) of the compressed video signal may, in some cases, become smaller than the total word count (k1×k2 words) of the information word. In such cases, appropriate data is added to the compressed video signal so that its word count becomes equal to the total word count of the information word. The information word is C2-encoded in the column direction, to which a C2 check word is appended, and the information word and the C2 check word are C1-encoded in the row direction, to which a C1 check word is appended. The information word, C1 check word, and C2 check word together form an error-correcting block. The sync-ID appending circuit 56 appends a synchronizing signal and an ID signal to each row of the error-correction block (FIG. 10(c)), the resulting data then being modulated for recording on the tape.

In the above-described video signal recording and reproducing apparatus of prior art, the video signal per unit time is divided into blocks of N×N pixels, an orthogonal transform is performed on each block, each of the resulting coefficients is quantized with a predetermined bit allocation, and each of the adaptive-quantized coefficients is encoded into an error-correction code for recording.

When the information amount of video signal is compressed by using high-efficiency encoding means employing the technique of orthogonal transform, the amount of information after compression varies according to the state of the image. On the other hand, the information amount earmarked for recording per unit time is fixed; therefore, when the video signal encoded by high-efficiency encoding is recorded, it sometimes happens that the information amount of the encoded video signal becomes smaller than the information amount earmarked for recording. In such cases, in the prior art video signal recording and reproducing apparatus, appropriate information is added to the high-efficiency encoded video signal so that the information amount thereof for recording becomes equal to the information amount earmarked for recording. Thus, the prior art has the problem that the space available for recording of further information is not effectively utilized because of the variation in the information amount of the video signal.

Furthermore, in the above video signal recording and reproducing apparatus, when the video signal is recorded and reproduced, if an error occurs in any of the coefficients in the orthogonal-transformed lower frequency range, the error manifests itself in a visually appreciable degradation of image such as block distortion; on the other hand, if there is an error in any of the coefficients in the higher frequency range, the visual effect of the error is not so appreciable. That is, if the same number of errors are contained in the coefficients in the lower frequency and higher frequency ranges of orthogonal transform, the effects of errors are different between the lower and higher frequency ranges. Therefore, it becomes necessary to provide a greater error-correcting ability for the coefficients in the lower frequency range than for the higher frequency range. On the other hand, if the same error-correcting ability is to be provided for the transform coefficients in both the lower and higher frequency ranges, it would involve appending more check words than necessary to the coefficients in the higher frequency range. This gives rise to the problem that the information amount available for recording is not effectively utilized, or the error-correcting ability is not sufficient for the lower frequency range.

As described, in the above video signal recording and reproducing apparatus, the video signal per unit time is divided into blocks of N×N pixels, an orthogonal transform is performed on each block, each of the resulting coefficients is quantized with a predetermined bit allocation, and each of the adaptive-quantized coefficients is encoded into an error-correction code for recording. This arrangement presents the problem that the residual correlations between coefficients near the DC component of each block cannot be effectively utilized for compressing the information amount of the video signal.

SUMMARY OF THE INVENTION

It is an object of the present invention to provide a video signal recording and reproducing apparatus capable of reproducing images that are sufficiently recognizable even in high speed replay mode.

It is another object of the invention to provide a video signal recording and reproducing apparatus in which the ability to correct or detect errors in the coefficients in the lower frequency range, which errors result in appreciable degradation of image, can be enhanced without increasing the amount of information.

It is a further object of the invention to provide a video signal recording and reproducing apparatus capable of recording a larger amount of video signal.

In accordance with the present invention, there is provided a video signal recording and reproducing apparatus in which data for high-speed replay is produced by encoding selected coefficients and recorded separately from data encoded for normal replay, the data for normal replay being reproduced in normal replay mode and the data for high-speed replay reproduced in high-speed replay mode. The coefficients used to produce the data for high-speed replay are ones (low-frequency components) selected from the coefficients in each block of low-frequency subband obtained through subband division or ones (low-frequency components) selected from the coefficients in each block obtained through block division. Since the data for high-speed replay is encoded by selecting coefficients of important components, the content of the image reproduced at high speed is sufficiently recognizable.

In a preferred embodiment of the invention, when the information amount of the video signal compressed by orthogonal transform is smaller than the information amount earmarked for recording, information whose amount is equal to the difference is selected from the low-frequency coefficients in the compressed video signal, and an information word is constructed using all the coefficients plus the selected low-frequency coefficients. The selection of the low-frequency coefficients is done starting with the block in the center of the screen and then moving through the blocks toward the periphery of the screen. Since the low-frequency coefficients that cause appreciable degradation of image on the decoding side are thus recorded twice, this enhances the ability to detect any errors in such low-frequency coefficients, thus effectively utilizing the information amount available for recording.

In another preferred embodiment of the invention, the coefficients obtained from orthogonal transform are separated into, at least, low-frequency transform coefficients and other coefficients than the low-frequency coefficients, and check words are appended in such a manner that the minimum distance becomes greater in the low-frequency coefficients than in the coefficients other than the low-frequency coefficients. Further, the information sequence of the low-frequency coefficients is doubly encoded for error correction. This greatly enhances the ability to correct or detect errors in the low-frequency coefficients that cause appreciable degradation of image on the decoding side, so that any errors occurring in such low-frequency coefficients can be easily corrected or detected.

In a further preferred embodiment of the invention, after the whole video signal is compressed, the low-frequency coefficients are further compressed. This achieves a higher data compression ratio than when compressing data in a single process.

The above and further objects and features of the invention will more fully be apparent from the following detailed description with accompanying drawings.

BRIEF DESCRIPTION OF THE DRAWINGS

FIG. 4(a) through FIG. 4(d) are diagrams showing the frequency characteristics of the various filters used for dividing the video signals into subbands.

FIG. 5 is a diagram explaining how the screen is divided into blocks.

FIG. 7 is a diagram explaining how image blocks are allocated to recording tracks in the video signal recording and reproducing apparatus.

FIG. 9 is a diagram illustrating the sequence of high-efficiency encoding in the prior art video signal recording and reproducing apparatus of FIG. 8.

FIG. 11 is a block diagram showing the configuration of a video signal recording and reproducing apparatus according to a first embodiment of the invention.

DESCRIPTION OF THE PREFERRED EMBODIMENTS

Figure 1:
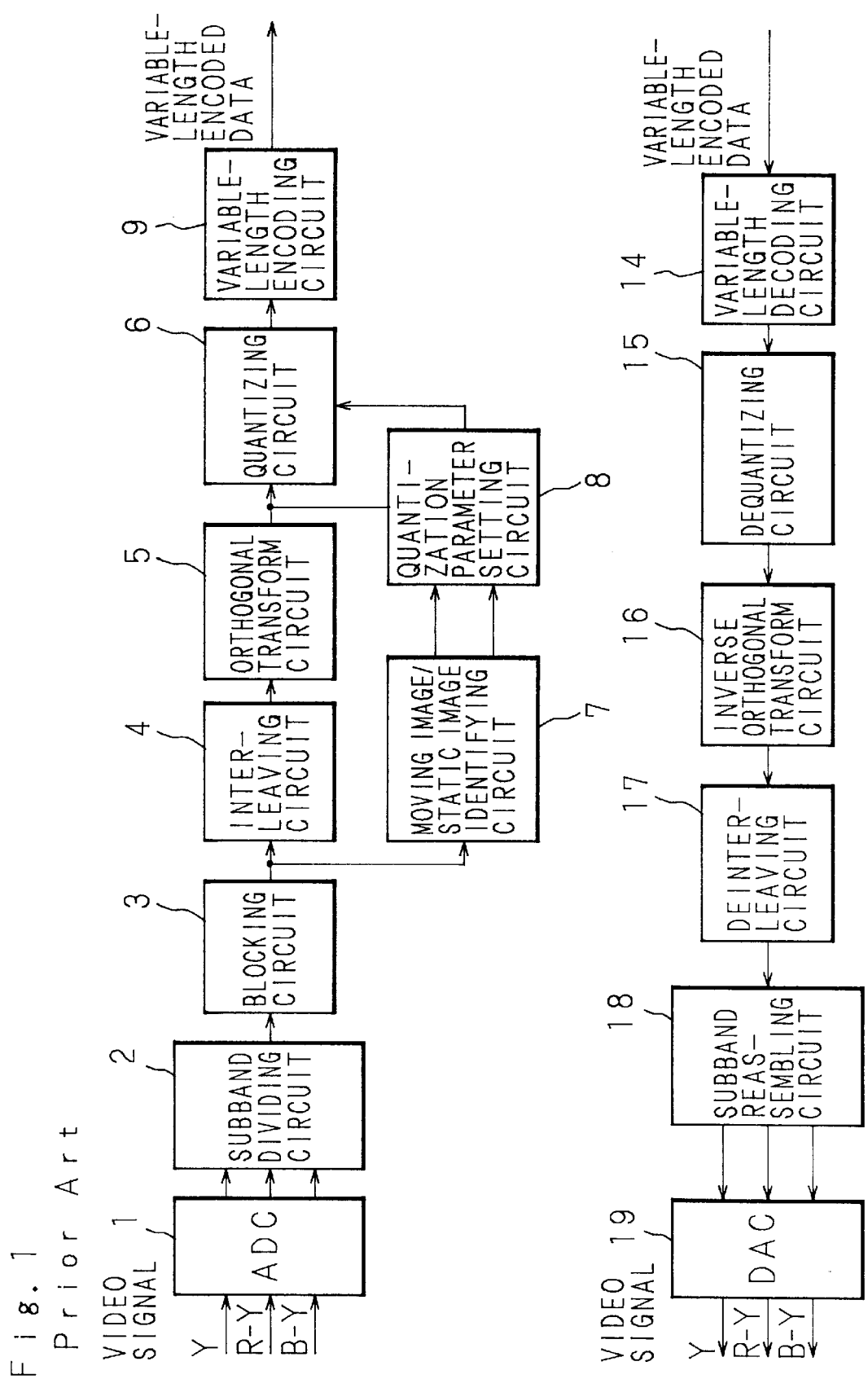
FIG. 1 is a block diagram showing the configuration of a prior art video signal recording and reproducing apparatus.

The preferred embodiments of the present invention will now be described in detail with reference to the accompanying drawings.

(Embodiment 1)

FIG. 11 is a block diagram showing the configuration of a video signal recording and reproducing apparatus according to a first embodiment of the invention. In the diagram, the reference numeral 1 designates an ADO which converts analog video input signals (containing the luminance signal (Y signal) and color-difference signals (R-Y and B-Y signals)) into digital signals. The digitized video signals are each divided by a subband dividing circuit 2 into four subbands according to the frequency, which are then supplied to a blocking circuit 3. In the blocking circuit 3, each subband signal supplied from the subband dividing circuit 2 is arranged into two-dimensional blocks (each block including 8 pixels×8 lines) which are sequentially supplied to an interleaving circuit 4. The interleaving circuit 4 rearranges the two-dimensional blocks and supplies the rearranged blocks to an orthogonal transform circuit 5. The orthogonal transform circuit 5 carries out orthogonal transform to obtain coefficients and supplies the coefficients to a quantizing circuit 6. The quantizing circuit 6 quantizes the output of the orthogonal transform circuit 5; the quantized coefficients are supplied to a variable-length encoding circuit 9 as well as to a high-speed replay signal encoding circuit 10. The variable-length encoding circuit 9 encodes all the outputs of the quantizing circuit 6 into variable-length data and supplies the resulting variable-length encoded data as a normal replay signal S1 to a framing circuit 11. On the other hand, the high-speed replay signal encoding circuit 10 encodes only important components in the output of the quantizing circuit 6 into variable-length data, and supplies the resulting variable-length encoded data as a high-speed replay signal S2 to the framing circuit 11. The framing circuit 11 records the supplied signals separately on each recording track.

The configuration of the reproducing system of the above apparatus will now be described below. The reference numeral 12 designates a frame separating circuit, which separates the normal replay signal S1 and high-speed replay signal S2 recorded on the recording track and supplies the respective signals separately to a decoder 13. The decoder 13 selects one or other of the signals according to the kind of replay mode, decodes the selected signal, and supplies the decoded data to a dequantizing circuit 15. The dequantizing circuit 15 expands the output of the decoder 13 in accordance with a quantization parameter; the dequantized transform coefficients are supplied to an inverse orthogonal transform circuit 16. The inverse orthogonal transform circuit 16 performs an inverse orthogonal transform on the output of the dequantizing circuit 15, and supplies the resulting data to a deinterleaving circuit 17. The deinterleaving circuit 17 rearranges the blocks back into the original order and supplies the rearranged blocks to a subband reassembling circuit 18. The subband reassembling circuit 18 reassembles the components outputted from the deinterleaving circuit 17 and feeds the reassembled data to a DAC 19. The DAC 19 converts the digital video signals outputted from the subband reassembling circuit 18 into the original analog video signals.

Figure 2:
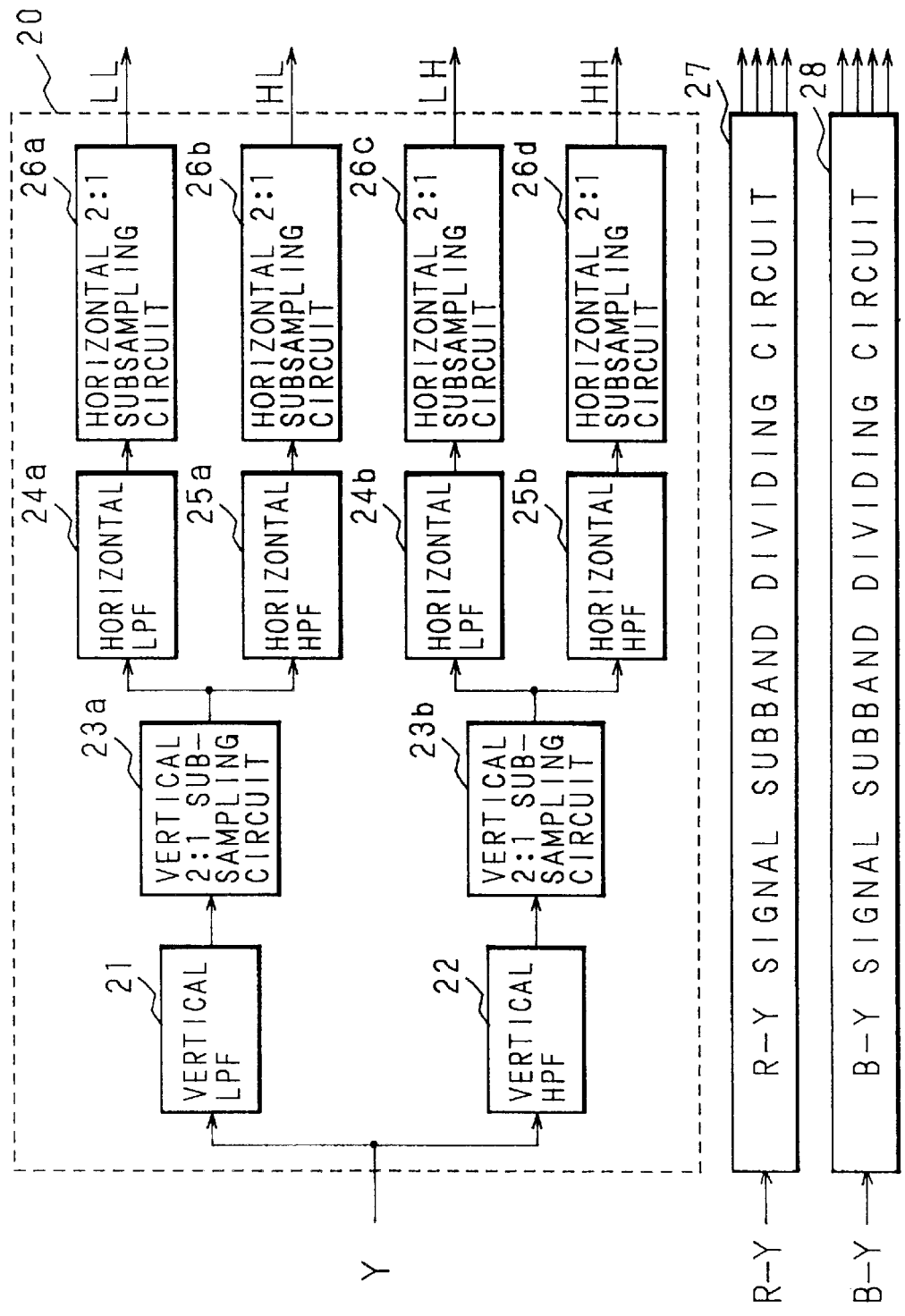
FIG. 2 is a block diagram showing the internal configuration of a subband dividing circuit in the video signal recording and reproducing apparatus of FIG. 1.

The internal configuration of the subband dividing circuit 2 is the same as that of the prior art example illustrated in FIG. 2, and therefore, the description thereof is omitted herein.

Figure 3A:
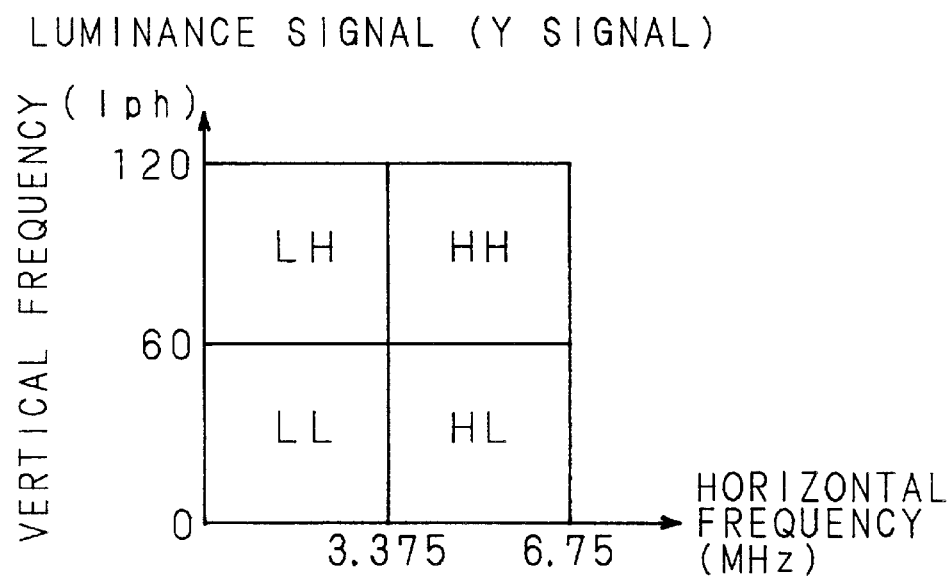
FIG. 3(a) and FIG. 3(b) are diagrams illustrating how video signals are divided into subbands.
Figure 3B:
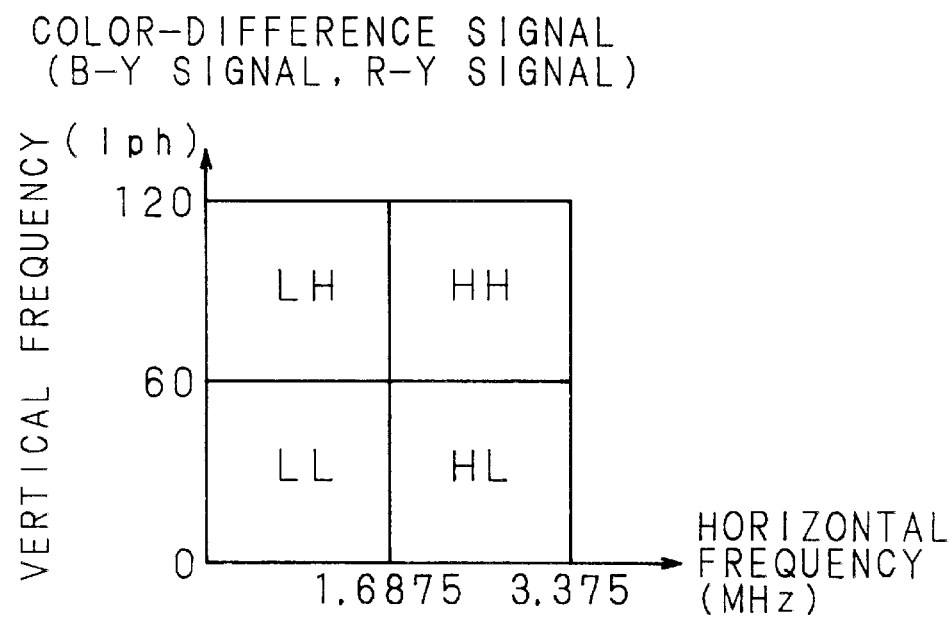
Figure 6A:
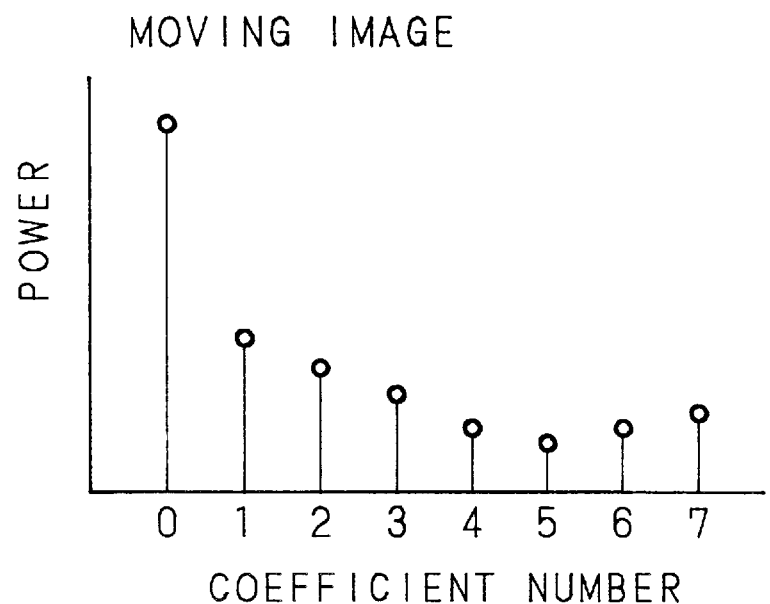
FIG. 6 is a diagram showing the power distribution of DCT coefficients, FIG. 6(a) for a moving image and FIG. 6(b) for a static image.
Figure 6B:
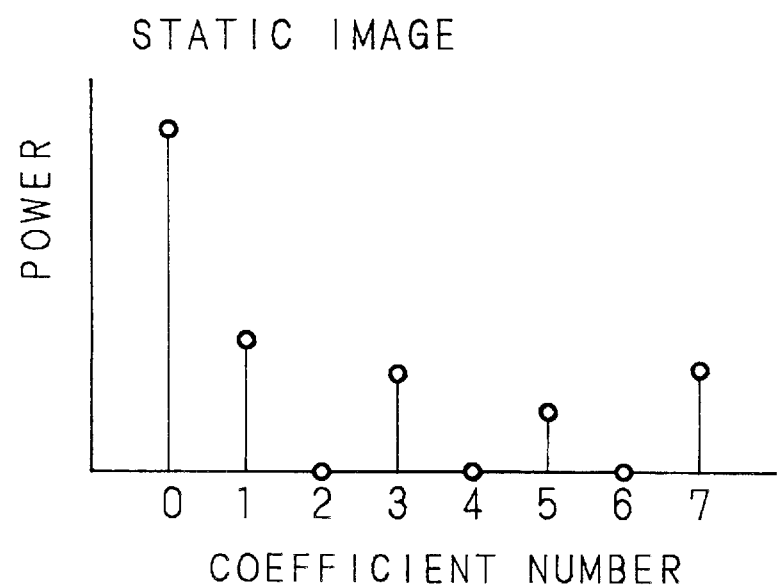
Figure 8:
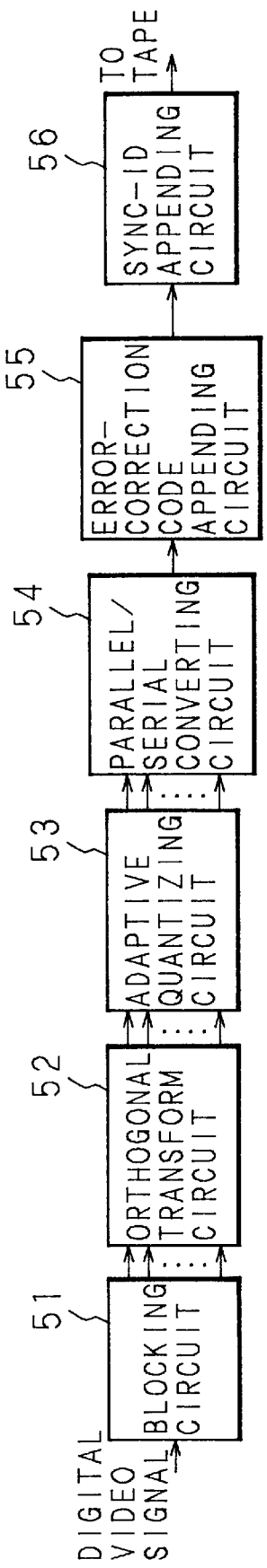
FIG. 8 is a block diagram showing the configuration of another prior art video signal recording and reproducing apparatus.
Figure 10A:
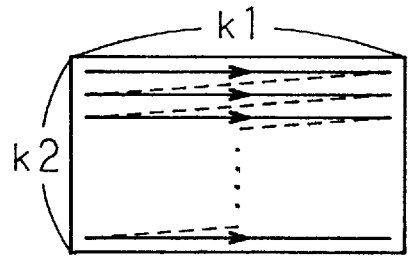
FIG. 10(a) through FIG. 10(c) are diagrams showing the sequence of error-correction coding in the prior art video signal recording and reproducing apparatus of FIG. 8.
Figure 10B:
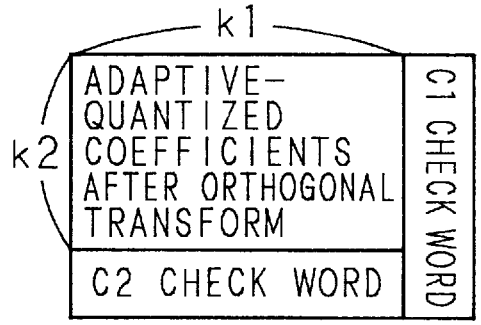
Figure 10C:
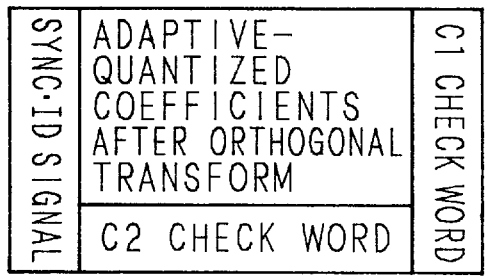

The operation of this embodiment will now be described. Analog video signals, i.e. the luminance signal (Y signal) and color-difference signals (R-Y and B-Y signals), are inputted to the ADC 1 for conversion into digital video signals. The subband dividing circuit 2 divides each of the digital video signals for one field into four frequency bands (subbands), for example, LL, HL, LH, and HH, as shown in FIG. 3. The operation of the subband dividing circuit 2 is the same as that of the previously described prior art example, and therefore, the description thereof is omitted herein. The Y, R-Y, and B-Y signals, divided into subbands, are each divided by the blocking circuit 3 into blocks of 8 pixels (horizontal)×8 lines (vertical), for example. More specifically, the image data for one field is divided by the blocking circuit 3 into a total of 330 subband blocks, i.e. 22 subband blocks (horizontal)×15 subband blocks (vertical), as shown in FIG. 5; in this case, the subband block refers to two horizontally adjacent blocks in the Y signal plus their corresponding blocks in the R-Y and B-Y signals.

In order to disperse the risk of signal loss that may occur during transmission, the interleaving circuit 4 rearranges the subband- and block-divided video data in such a manner that the blocks initially neighboring each other do not neighbor each other wherever possible. This process is generally called interleaving. The output of the interleaving circuit 4 is fed to the orthogonal transform circuit 5 which carries out orthogonal transform, for example, a discrete cosine transform (DCT), to obtain coefficients. Each of the obtained coefficients is quantized by the quantizing circuit 6 adaptively to each individual subband. The transform coefficients quantized by the quantizing circuit 6 are encoded by the variable-length encoding circuit 9 into variable-length data; the encoded data is supplied as the normal replay signal S1 to the framing circuit 11.

Figure 12:
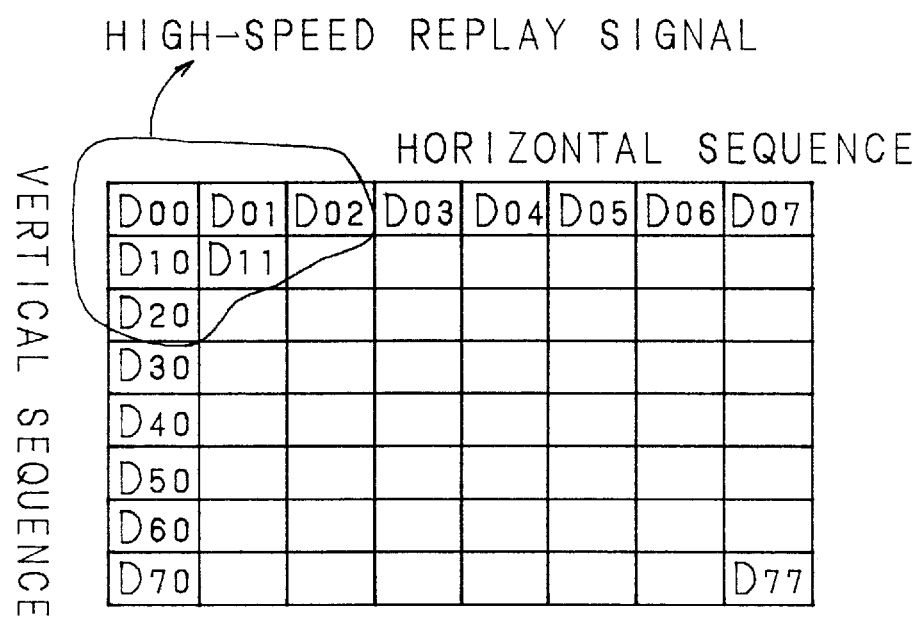
FIG. 12 is a diagram explaining the encoding of a high-speed replay signal according to the first embodiment of the invention.

In high-speed replay, it suffices for the purpose if the content of the replayed scene is recognizable. Therefore, only important components of the video data are encoded and recorded, and in high-speed replay, only these important components are decoded and replayed. The content of the scene thus replayed is sufficiently recognizable. Each video signal, divided into four subbands, contains important video data components in its low-frequency band (LL band). Also, of the components obtained by the orthogonal transform of each LL band, lower frequency components contain image data components of greater importance. Therefore, if a scene is replayed using only the lower frequency components, the content of the scene is sufficiently recognizable. Accordingly, in the present embodiment, out of the coefficients obtained from the LL band of each of the Y, R-Y, and B-Y signals, only six coefficients representing lower frequency components are selected, as shown in FIG. 12, for variable-length encoding by the high-speed replay signal encoding circuit 10, and the resulting encoded data is supplied as the high-speed replay signal S2 to the framing circuit 11.

Figure 13:
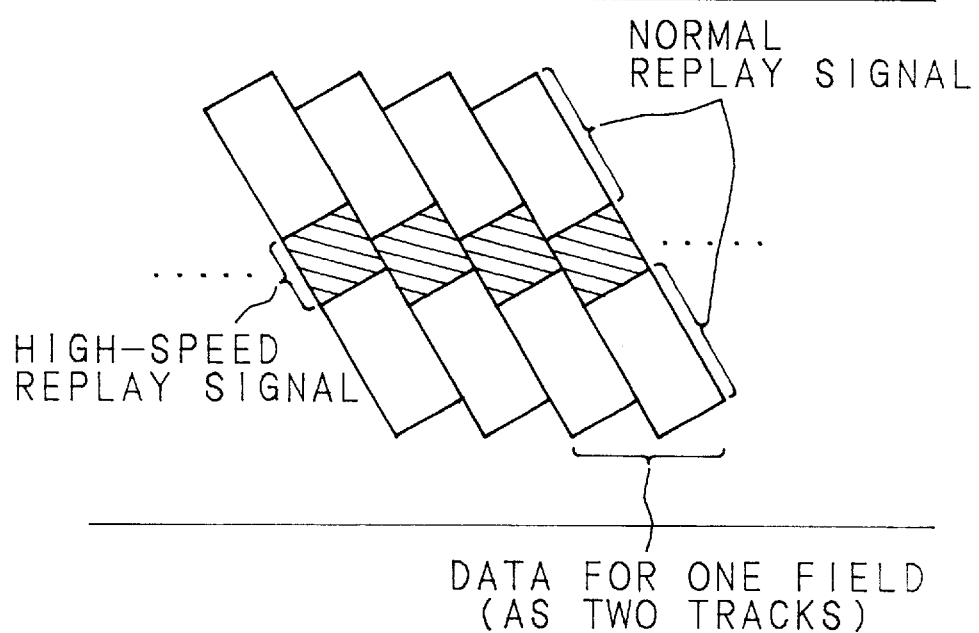
FIG. 13 is a diagram explaining the track format for recording the high-speed replay signal and the normal replay signal in accordance with the first embodiment of the invention.

In the framing circuit 11, the normal replay signal S1 and the high-speed replay signal S2, which are supplied on a block-by-block basis from the variable-length encoding circuit 9 and the high-speed replay signal encoding circuit 10, respectively, are stored for one field in a buffer memory. The video data for one field then undergoes error-correction coding, with synchronizing signals appended thereto, and are outputted for recording as two tracks of information. The normal replay and high-speed replay signals for one field are recorded in separate areas of each track as shown in FIG. 13. The output of the framing circuit 11 is transferred on a transmission channel, such as a digital circuit, and the output signal is then fed to a rotating head via a recording amplifier and a rotating transformer.

The reproducing system (decoding side) operates by reversing the process of the recording system (encoding side). The recorded normal replay signal S1 and high-speed replay signal S2 first undergo error-correction by the frame separating circuit 12, and are then supplied to the decoder 13. The decoder 13 selects the normal replay signal S1 when in normal replay mode and the high-speed replay signal S2 when in high-speed replay mode, and decodes the selected signal. The decoded data is dequantized by the dequantizing circuit 15 to reconstruct the original two-dimensional coefficients. The coefficients are fed to the inverse orthogonal transform circuit 16 which performs an inverse orthogonal transform to reconstruct the original subband blocks. The reconstructed subband blocks are rearranged by the deinterleaving circuit 17 back into the original order, after which the subband reassembling circuit 18 reassembles the subband blocks. The reconstructed digital video signals are converted by the DAC 19 into analog signals, thus reproducing the original video signals.

In this embodiment, out of the coefficients obtained from the LL band of each of the Y, R-Y, and B-Y signals, six coefficients representing lower frequency components are variable-length encoded to produce the high-speed replay signal, but it will be appreciated that the number of the coefficients to be selected need not necessarily be six; it is only necessary to encode more than one coefficient. Furthermore, in this embodiment, data for one field is recorded on two tracks, but it will be appreciated that the number of tracks used need not necessarily be two nor is it necessary to record data on a field-by-field basis.

(Embodiment 2)

In the foregoing first embodiment, the normal replay signal and the high-speed replay signal are encoded independently, but alternatively, the high-speed replay signal may be encoded as part of the normal replay signal, and the high-speed replay signal so encoded may be recorded together in a designated area of each recording track. The second embodiment of the invention employs such arrangement.

Figure 14:
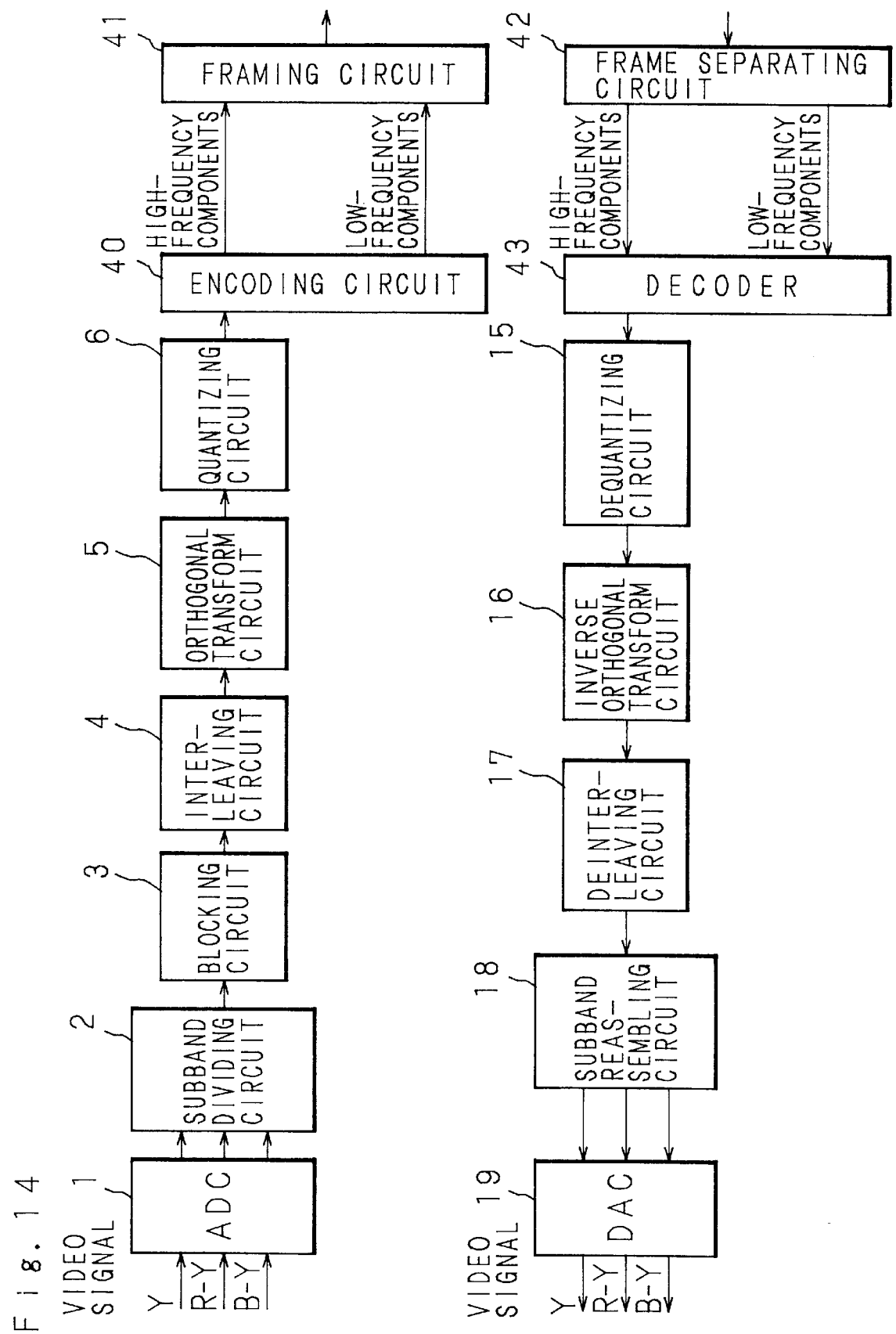
FIG. 14 is a block diagram showing the configuration of a video signal recording and reproducing apparatus according to a second embodiment of the invention.

FIG. 14 is a block diagram showing the configuration of a video signal recording and reproducing apparatus according to the second embodiment. In the diagram, the same reference numerals are used to designate the same parts as those in FIG. 11. The reference numeral 40 designates an encoding circuit which encodes the output of the quantizing circuit 6 and separates the encoded result into high-frequency and low-frequency components to supply to a framing circuit 41. The framing circuit 41 records the supplied high-frequency and low-frequency components in separate areas. The reference numeral 42 indicates a frame separating circuit which separates the replayed data into the high-frequency and low-frequency components and supplies them separately to a decoder 43. The decoder 43 decodes the output of the frame separating circuit 42.

Figure 15:
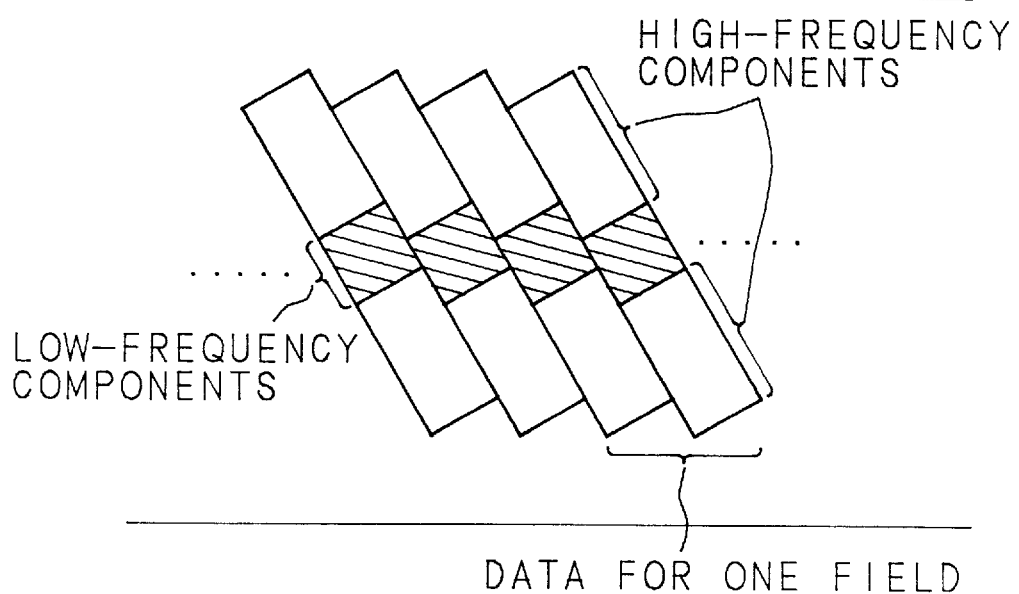
FIG. 15 is a diagram explaining the track format for recording the high-speed replay signal and the normal replay signal in accordance with the second embodiment of the invention.

The operation of this embodiment will now be described. The operation from the ADC 1 through the quantizing circuit 6 is the same as that of the first embodiment, and therefore, the description thereof is omitted herein. The coefficients quantized by the quantizing circuit 6 are supplied to the encoding circuit 40. In the encoding circuit 40, out of the supplied coefficients, six coefficients representing lower frequency components of the LL band, as shown in FIG. 12, are encoded to obtain the low-frequency components, while on the other hand, the remaining higher frequency components in the LL band and the data in the LH, HL, and HH are encoded to obtain the high-frequency components. The thus obtained low-frequency and high-frequency components are supplied to the framing circuit 41. In the framing circuit 41, the low-frequency and high-frequency components which are output on a block-by-block basis are stored for one field in a buffer memory. The video data for one field then undergoes error-correction coding, with synchronizing signals appended thereto, and are outputted for recording as two tracks of information. The low-frequency and high-frequency components of each block are then assembled for one field and recorded in separate areas of each track, as shown in FIG. 15. The output of the framing circuit 41 is transferred on a transmission channel, such as a digital circuit, and the output signal is fed to a rotating head via a recording amplifier and a rotating transformer.

The reproducing system (decoding side) operates by reversing the process of the recording system (encoding side). The recorded low-frequency and high-frequency components first undergo error-correction by the frame separating circuit 42, and then supplied to the decoder 43. The decoder 43 decodes both the low-frequency and high-frequency components when in normal replay mode and decodes only the low-frequency components when in high-speed replay mode. The decoded data is fed to the dequantizing circuit 15. The operation thereafter is the same as that in the foregoing first embodiment, and therefore, the description thereof is omitted herein. In the second embodiment, only the areas where the low-frequency components are recorded are replayed in high-speed replay mode to reproduce the image for high-speed replay mode, and in normal replay mode, both the areas where the low-frequency components are recorded and the areas where the high-frequency components are recorded are replayed to reproduce the image for normal replay mode.

In this embodiment, out of the coefficients obtained from the LL band of each of the Y, R-Y, and B-Y signals, six coefficients representing lower frequency components are encoded as the low-frequency components for high-speed replay, but it will be appreciated that the number of the coefficients to be selected need not necessarily be six but that any number greater than one will serve the purpose. Furthermore, in this embodiment, data for one field is recorded on two tracks, but it will be appreciated that the number of tracks used need not necessarily be two nor is it necessary to record data on a field-by-field basis.

(Embodiment 3)

In the first embodiment, the input video signals are first digitized and then divided into subbands, but the video signals need not necessarily be divided into subbands, but may be divided directly into blocks. The third embodiment of the invention employs such a configuration.

Figure 16:
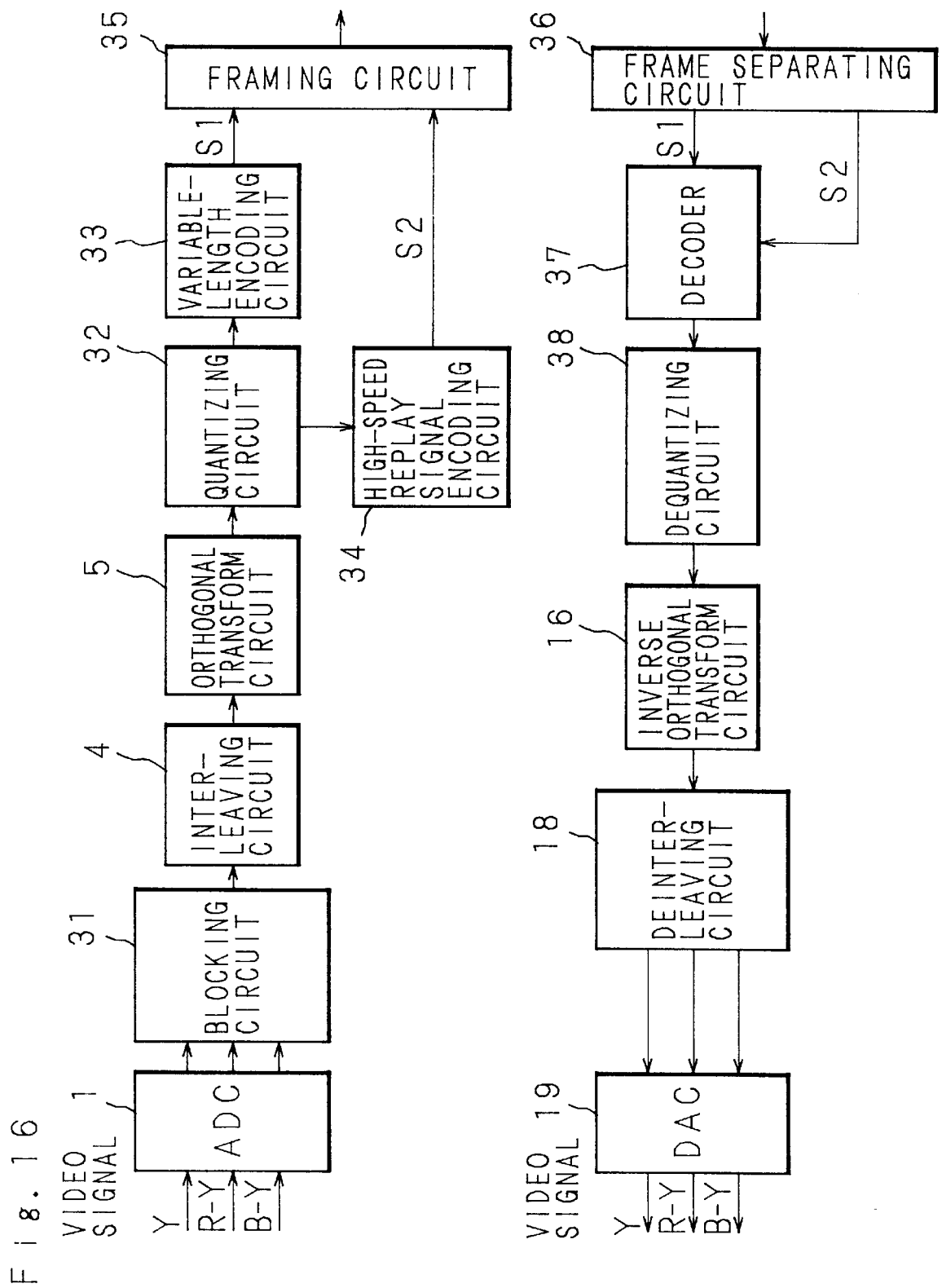
FIG. 16 is a block diagram showing the configuration of a video signal recording and reproducing apparatus according to a third embodiment of the invention.

FIG. 16 is a block diagram showing the configuration of a video signal recording and reproducing apparatus according to the third embodiment. In the diagram, the same reference numerals are used to designate the same parts as those in FIG. 11. The reference numeral 31 designates a blocking circuit which divides the digital video signals outputted from the ADC 1 into blocks and supplies video data in blocks to the interleaving circuit 4. The reference numeral 32 designates a quantizing circuit which quantizes coefficients outputted from the orthogonal transform circuit 5; the quantized coefficients are supplied to a variable-length encoding circuit 33 as well as to a high-speed replay signal encoding circuit 34. The variable-length encoding circuit 33 encodes all the outputs of the quantizing circuit 32 into variable-length data and supplies the resulting variable-length encoded data as a normal replay signal S1 to a framing circuit 35. On the other hand, the high-speed replay signal encoding circuit 34 encodes only important components in the output of the quantizing circuit 32 into variable-length data and supplies the resulting variable-length encoded data as a high-speed replay signal S2 to the framing circuit 35. The framing circuit 35 records the supplied signals separately on each recording track. The reference numeral 36 designates a frame separating circuit which separates the normal replay signal S1 and high-speed replay signal S2 recorded on the recording tracks and supplies the respective signals separately to a decoder 37. The decoder 37 selects one or other of the signals according to the mode of replay, decodes the selected signal, and supplies the decoded data to a dequantizing circuit 38. The dequantizing circuit 38 expands the output of the decoder 37 in accordance with a quantization parameter and the dequantized transform coefficients are supplied to the inverse orthogonal transform circuit 16.

The operation of this embodiment will now be described. Analog video signals, i.e. the luminance signal (Y signal) and color-difference signals (R-Y and B-Y signals), are input to the ADC 1 for conversion into digital signals. The digitized Y, R-Y, and B-Y signals are divided by the blocking circuit 31 into blocks of 8 pixels (horizontal)×8 lines (vertical), for example. More specifically, the image data for one field is divided by the blocking circuit 31 into a total of 1320 subblocks, i.e. 44 subblocks (horizontal)×30 subblocks (vertical); in this case, the subblock refers to two horizontally adjacent blocks in the Y signal plus their corresponding blocks in the R-Y and B-Y signals.

In order to disperse the risk of signal loss that may occur during transmission, the interleaving circuit 4 rearranges the blocks of video data on a subblock basis in such a manner that the blocks initially neighboring each other do not neighbor each other wherever possible. The output of the interleaving circuit 4 is fed to the orthogonal transform circuit 5 which carries out orthogonal transform, for example, a discrete cosine transform (DCT), to obtain coefficients. Each of the obtained coefficients is quantized by the quantizing circuit 32 adaptively to each individual signal. The coefficients quantized by the quantizing circuit 32 are encoded by the variable-length encoding circuit 33 into variable-length data; the encoded data is supplied as the normal replay signal S1 to the framing circuit 35.

Figure 17:
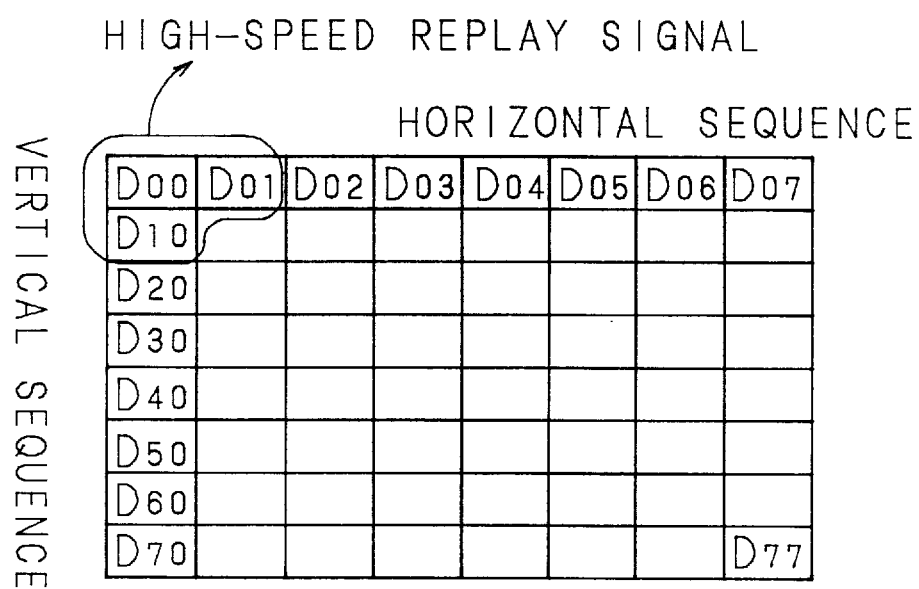
FIG. 17 is a diagram explaining the encoding of a high-speed replay signal according to the third embodiment of the invention.

In high-speed replay, it suffices for the purpose if the content of the replayed scene is recognizable. Therefore, only important components of the video data are encoded and recorded, and in high-speed replay, these important components alone are decoded and replayed. The content of the scene thus replayed is sufficiently recognizable. When the video data is orthogonal-transformed, the lower frequency components of the coefficients contain video data components of greater importance. Therefore, if a scene is replayed using only the low-frequency components, the content of the scene is sufficiently recognizable. Accordingly, in this embodiment, out of the coefficients of the Y, R-Y, and B-Y signals, only three coefficients representing lower frequency components are selected, as shown in FIG. 17, for variable-length encoding by the high-speed replay signal encoding circuit 34, and the resulting encoded data is supplied as the high-speed replay signal S2 to the framing circuit 35.

In the framing circuit 35, the normal replay signal S1 and the high-speed replay signal S2, which are supplied on a block-by-block basis from the variable-length encoding circuit 33 and the high-speed signal encoding circuit 34 respectively, are stored for one field in a buffer memory. The video data for one field then undergoes error-correction coding, with synchronizing signals appended thereto, and are outputted for recording as two tracks of information. The normal replay and high-speed replay signals for one field are recorded in separate areas of each tracks, as shown in FIG. 13. The output of the framing circuit 35 is transferred on a transmission channel, such as a digital circuit, and the output signal is fed to a rotating head via a recording amplifier and a rotating transformer.

The reproducing system (decoding side) operates by reversing the process of the recording system (encoding side). The recorded normal replay signal S1 and high-speed replay signal S2 first undergo error correction by the frame separating circuit 36, and are then supplied to the decoder 37. The decoder 37 selects the normal replay signal S1 when in normal replay mode and the high-speed replay signal S2 when in high-speed replay mode, and decodes the selected signal. The decoded data is dequantized by the dequantizing circuit 38 to reconstruct the original two-dimensional coefficients. The coefficients are fed to the inverse orthogonal transform circuit 16 which performs an inverse orthogonal transform to reconstruct the original subblocks. The reconstructed subblocks are rearranged by the deinterleaving circuit 17 back into the original order, and converted by the DAC 19 into analog signals, thus reproducing the original video signals.

In this embodiment, three coefficients representing lower frequency components are selected from the transform coefficients of the Y, R-Y, and B-Y signals and variable-length encoded to produce the high-speed replay signal, but it will be appreciated that the number of coefficients to be selected need not necessarily be three; it is only necessary to encode more than one coefficient. Furthermore, in this embodiment, data for one field is recorded on two tracks, but it will be appreciated that the number of tracks used need not necessarily be two nor is it necessary to record data on a field-by-field basis.

(Embodiment 4)

In the foregoing third embodiment, the normal replay signal and the high-speed replay signal are encoded independently, but alternatively, the high-speed replay signal may be encoded as part of the normal replay signal, and the high-speed replay signal so encoded may be recorded together in a designated area of each recording track. The fourth embodiment of the invention employs such arrangement.

Figure 18:
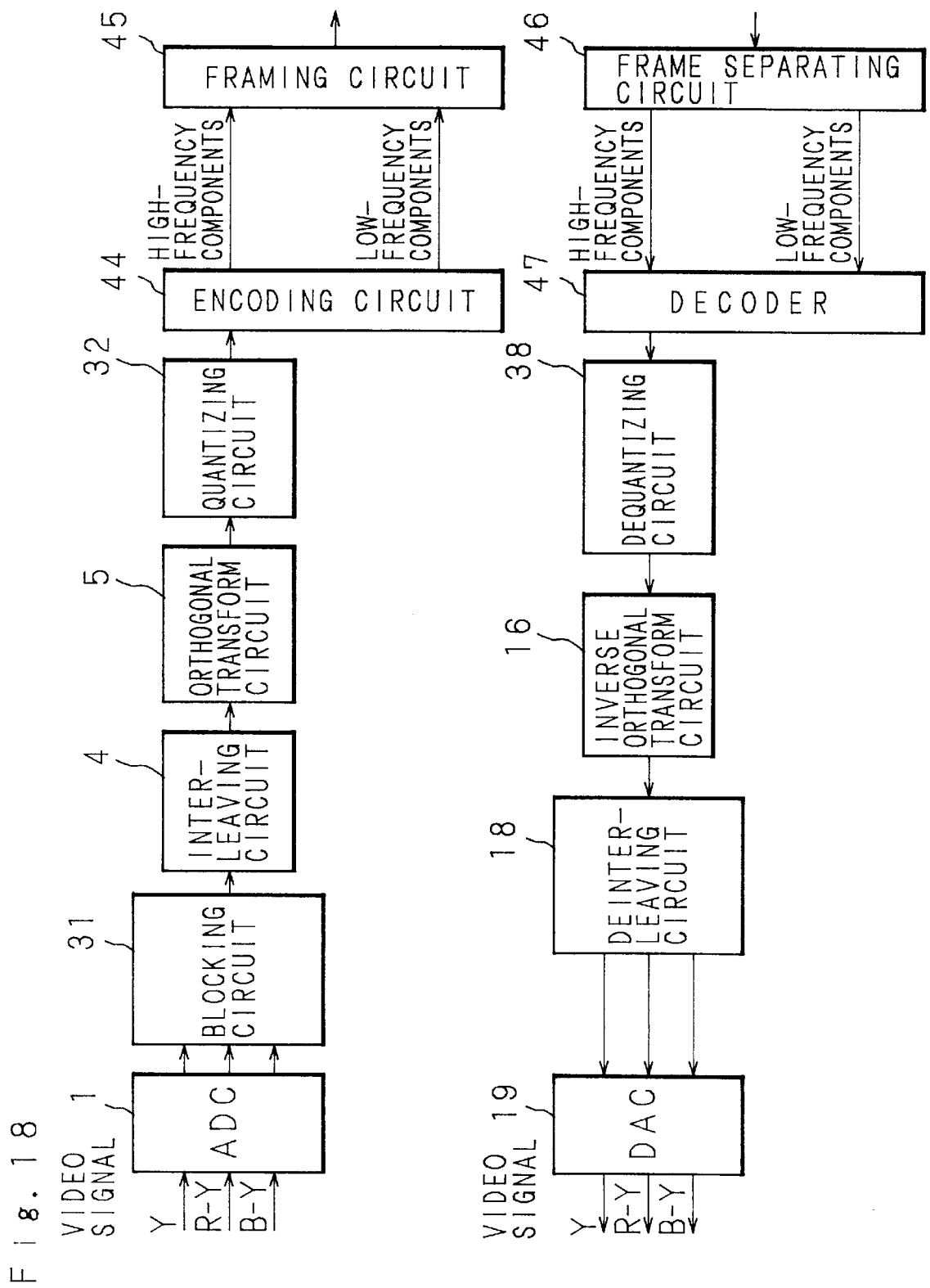
FIG. 18 is a block diagram showing the configuration of a video signal recording and reproducing apparatus according to a fourth embodiment of the invention.

FIG. 18 is a block diagram showing the configuration of a video signal recording and reproducing apparatus according to the fourth embodiment. In the diagram, the same reference numerals are used to designate the same parts as those in FIG. 16. The reference numeral 44 is an encoding circuit which encodes the output of the quantizing circuit 32 and separates the encoded result into high-frequency and low-frequency components to supply to a framing circuit 45. The framing circuit 45 records the supplied high-frequency and low-frequency components in separate areas. The reference numeral 46 designates a frame separating circuit which separates the replayed data into the high-frequency and low-frequency components and supplies them separately to a decoder 47. The decoder 47 decodes the output of the frame separating circuit 46.

The operation of this embodiment will now be described. The operation from the ADC 1 through the quantizing circuit 32 is the same as that in the third embodiment, and therefore, the description thereof is omitted herein. The quantized coefficients are supplied from the quantizing circuit 32 to the encoding circuit 44. In the encoding circuit 44, three coefficients representing low-frequency components are selected from the supplied transform coefficients, as shown in FIG. 17, and are encoded to obtain the lower frequency components, while on the other hand, the remaining data are encoded to obtain the high-frequency components. The thus obtained low-frequency and high-frequency components are supplied to the framing circuit 45. In the framing circuit 45, the low-frequency and high-frequency components which are outputted on a block-by-block basis from the encoding circuit 44 are stored for one field in a buffer memory. The video data for one field then undergoes error-correction coding, with synchronizing signals added thereto, and are outputted for recording as two tracks of information. The low-frequency and high-frequency components of each block are assembled for one field and recorded in separate areas of each track, as shown in FIG. 15. The output of the framing circuit 45 is transferred on a transmission channel, such as a digital circuit, and the output signal thereof is fed to a rotating head via a recording amplifier and a rotating transformer.

The reproducing system (decoding side) operates by reversing the process of the recording system (encoding side). The recorded low-frequency and high-frequency components first undergo error correction by the frame separating circuit 46, and are then supplied to the decoder 47. The decoder 47 decodes both the low-frequency and high-frequency components when in normal replay mode and decodes only the low frequency components when in high-speed replay mode. The decoded data is fed to the dequantizing circuit 38. The operation thereafter is the same as that in the third embodiment, and therefore, the description thereof is omitted herein.

In this embodiment, three coefficients representing lower frequency components are selected from the coefficients of the Y, R-Y, and B-Y signals and encoded as the low-frequency components for high-speed replay, but it will be appreciated that the number of coefficients to be selected need not necessarily be three; it is only necessary to encode more than one coefficient. Furthermore, in this embodiment, data for one field is recorded on two tracks, but it will be appreciated that the number of tracks used need not necessarily be two nor is it necessary to record data on a field-by-field basis.

(Embodiment 5)

Figure 19:
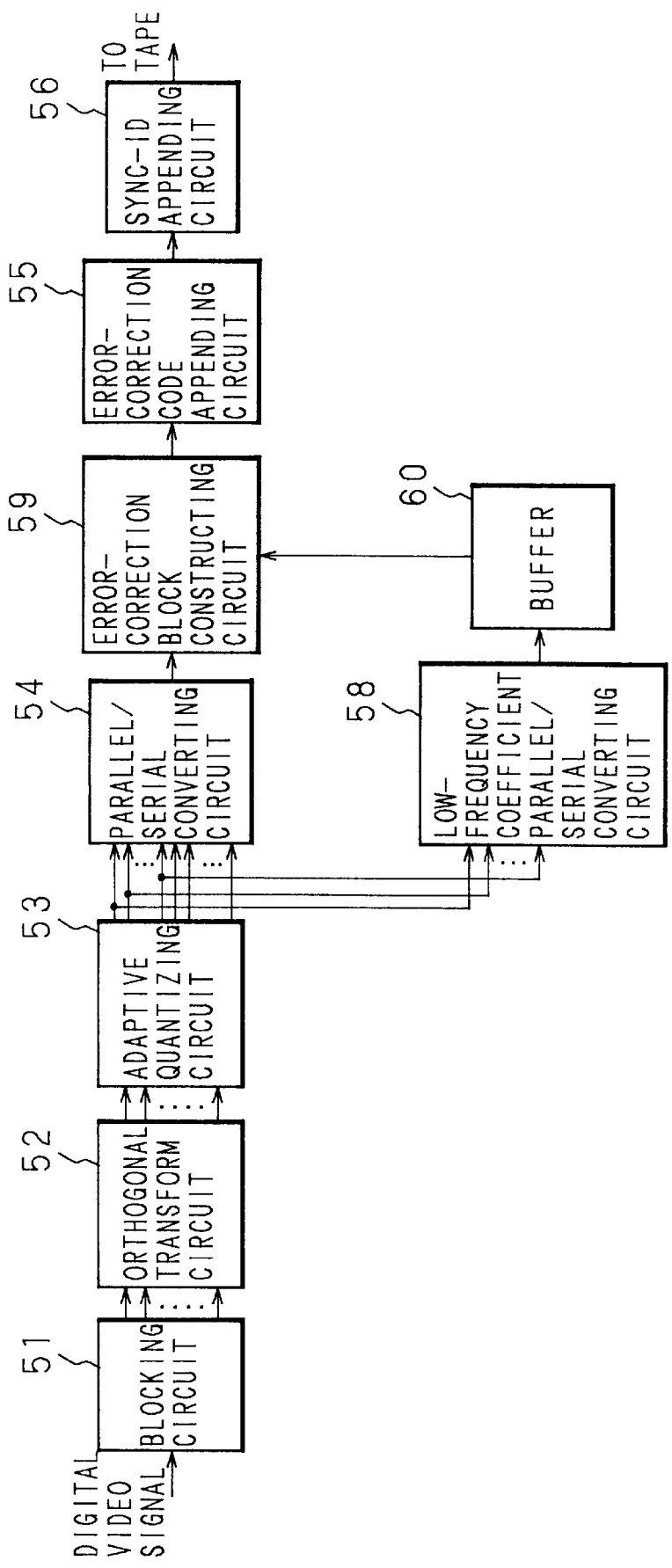
FIG. 19 is a block diagram showing the configuration of a video signal recording and reproducing apparatus according to a fifth embodiment of the invention.

A fifth embodiment of the invention will now be described with reference to FIG. 19 which shows the configuration of the embodiment. In FIG. 19, the reference numeral 51 designates a blocking circuit which divides the input digital video signal into blocks each including of N pixels (N is an integer) in both the horizontal and vertical directions. The blocking circuit 51 supplies the blocks to an orthogonal transform circuit 52. The orthogonal transform circuit 52 performs an orthogonal transform on each block to obtain coefficients and supplies the resulting coefficients to an adaptive quantizing circuit 53. The adaptive quantizing circuit 53 quantizes each coefficient with a predetermined bit allocation and, after quantizing, supplies all the coefficients in parallel to a parallel/serial converting circuit 54 and low-frequency coefficients in parallel to a low-frequency coefficient parallel/serial converting circuit 58. The parallel/serial converting circuit 54 converts the coefficients entered thereto into serial form and outputs them serially to an error-correction block constructing circuit 59. On the other hand, the low-frequency coefficient parallel/serial converting circuit 58 converts the coefficients entered thereto into serial form and outputs them serially to a buffer 60. The buffer 60 temporarily stores the supplied coefficients; the stored data is subsequently read into the error-correction block constructing circuit 59 when needed. The error-correction block constructing circuit 59 assembles all the coefficients, plus the low-frequency coefficients, of the orthogonal-transformed video signal, to construct an information word including an array of k1×k2 words, and supplies the information word to an error-correction code appending circuit 55. The error-correction code appending circuit 55 C2-encodes the information word in column direction and appends a C2 check word, and further C1-encodes the information word and the C2 check word in row direction and appends a C1 check word, the resulting data then being transferred to a sync-ID appending circuit 56. The sync-ID appending circuit 56 appends a synchronizing signal and an ID signal to the information word and outputs the resulting data for recording on a tape as a recording medium.

Figure 20:
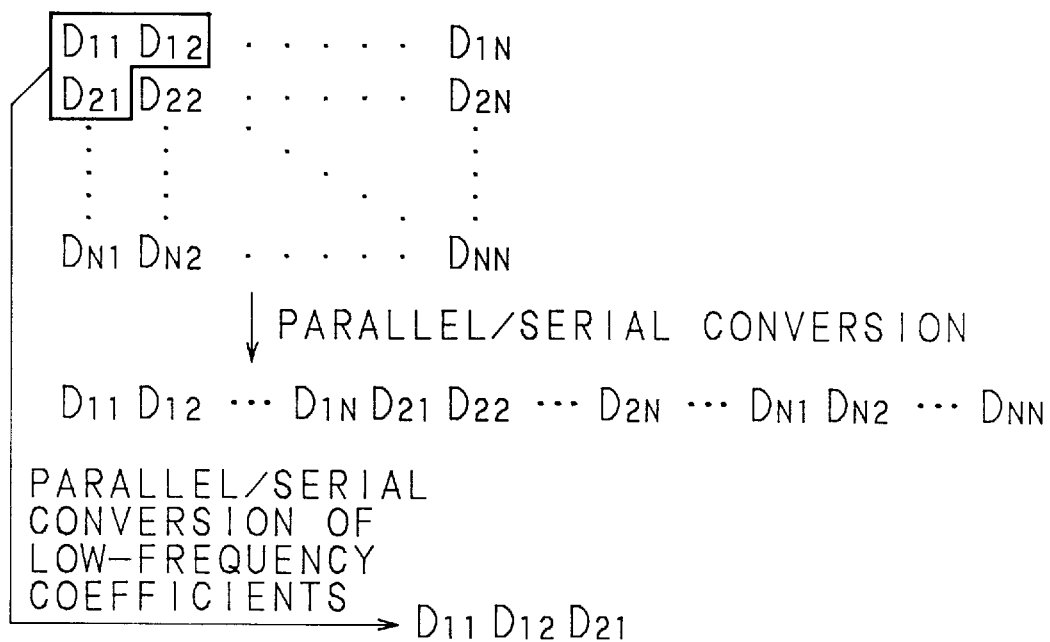
FIG. 20 is a diagram showing how coefficients are divided according to the fifth embodiment of the invention.

The operation of this embodiment will now be described. First, as in the previously described prior art example, the input digital video signal for one field (FIG. 9(a)) is divided by the blocking circuit 51 into blocks each including N pixels in both the horizontal and vertical directions (FIG. 9(b)), and the blocks are supplied one by one to the orthogonal transform circuit 52. The orthogonal transform circuit 52 performs an orthogonal transform on each block to obtain coefficients (FIG. 9(c)). The adaptive quantizing circuit 53 determines the class on the basis of the AC component power of each block, and quantizes each coefficient with the number of quantization levels based on the determined class (FIG. 9(d)), thus compressing the information amount of the video signal. The adaptive-quantized coefficients of each block, along with a coefficient for identifying the class of the block, are converted by the parallel/serial converting circuit 54 into serial form, while the adaptive-quantized low-frequency coefficients of each block are converted by the low-frequency coefficient paralle/serial converting circuit 58 into serial form (FIG. 20).

Figure 21:
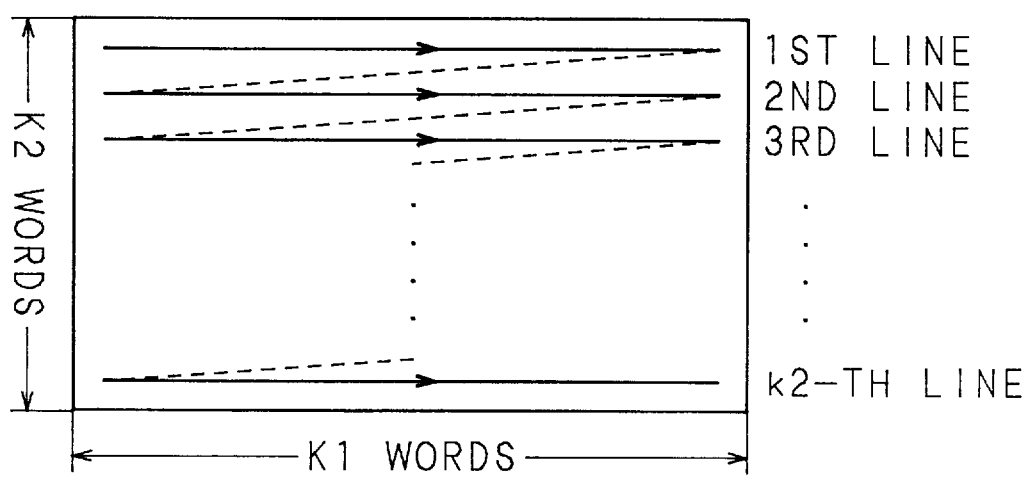
FIG. 21 is a diagram showing the sequence of inserting the coefficients into an information word according to the fifth embodiment of the invention.
Figure 22A:
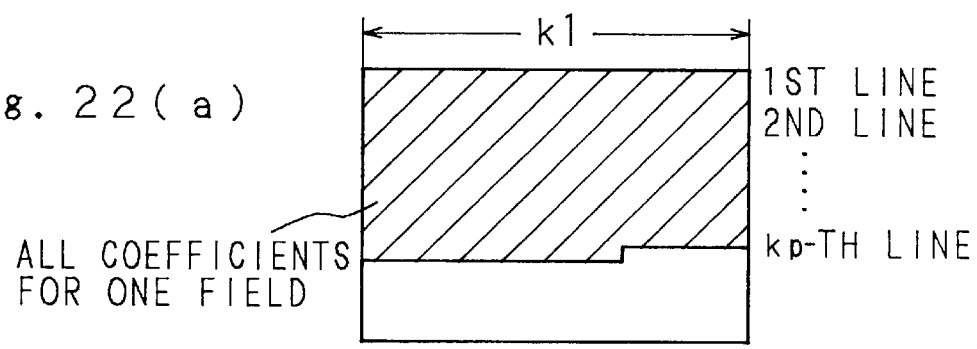
FIG. 22(a) through FIG. 22(d) are diagrams explaining a procedure for forming an information word and a method of encoding according to the fifth embodiment of the invention.
Figure 22B:
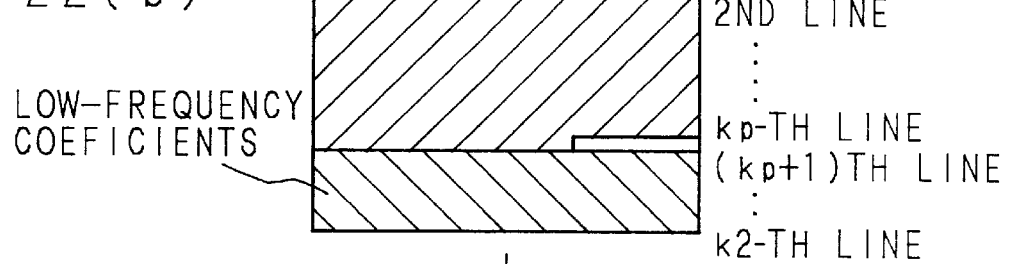

The adaptive-quantized coefficients for one field are then fed to the error-correction block forming circuit 59 which inserts them in a rectangular block of k1×k2 words in the order shown in FIG. 21 (1st line, 2nd line, 3rd line, . . . , k2-th line). In the meantime, the low-frequency coefficients converted into serial form by the low-frequency coefficient parallel/serial converting circuit 58 are temporarily stored in the buffer 60. Thus, all the adaptive-quantized coefficients for one field are inserted into the rectangular block, while all the low-frequency coefficients are stored in the buffer 60. At this time, if the rectangular block is loaded with coefficients up to the kp-th line (FIG. 22(a)), the low-frequency coefficients read from the buffer 60 are sequentially inserted into the rectangular block starting from the (kp+1)th line, to complete the formation of the information word of k1×k2 words (FIG. 22(b)).

Figure 22C:
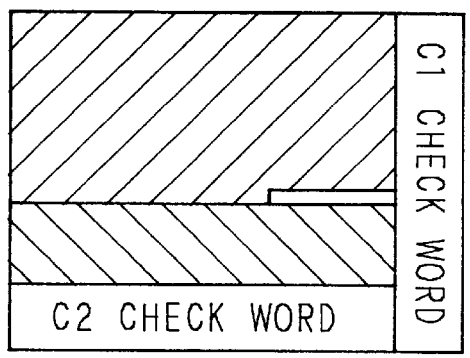
Figure 22D:
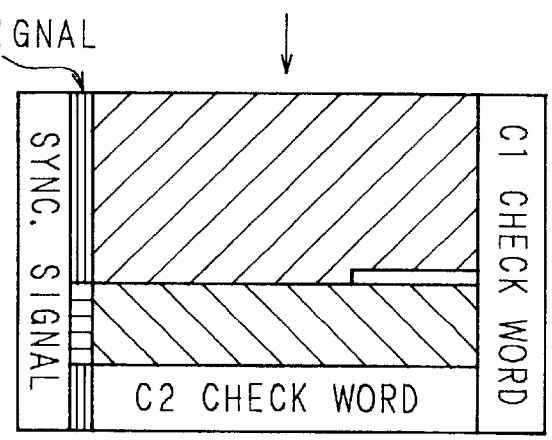

The thus formed information word then undergoes error-correction coding by the error-correction code appending circuit 55. That is, as in the previously described prior art example, the information word is C2-encoded in column direction and the C2 check word is appended, and the information word and the C2 check word are C1-encoded in row direction and the C1 check word is appended. The information word, the C1 check word, and the C2 check word together form an error-correction block (FIG. 22(c)). The sync-ID appending circuit 56 appends a synchronizing signal and an ID signal to each row of the error-correction block (FIG. 22(d)), the ID signal being used to identify if the data in each row represents the compressed video signal or includes only of low-frequency coefficients. The error-correction block, with the synchronizing and ID signals appended thereto, are then modulated for recording on tape.

The replayed signal first undergoes error-correction and error-detection using the check words appended during the recording, and is then separated into the doubly recorded low-frequency coefficients and other coefficients, using the ID signal appended during the recording. The low-frequency coefficients that are recorded twice are compared against each other; when there is a match, it is determined that there is no error in the low-frequency coefficients, and when there is no match, it is determined that there is an error in the low-frequency coefficients, and correction is made using coefficients of the same level in adjacent blocks. Each of the coefficients then undergoes adaptive dequantization and inverse orthogonal transform, to reproduce the video signal. In the above process, when no match is found between the low-frequency transform coefficients that are recorded twice, an error flag is attached, based on which error-correction and error-detection are made on the low-frequency coefficients, whereas the coefficients other than the low-frequency coefficients are subjected to error-correction and error-detection without undergoing such a process.

As described, when the information amount of the compressed video signal is smaller than the predetermined information amount available for the information word, low-frequency coefficients are further added to complete the formation of the information word, and error-correction coding is performed on the thus constructed information word. Therefore, if there occurs an error in the recording or reproducing process, since the low-frequency coefficients are recorded twice, the error detection probability is increased, which means that the information amount available for the information word is effectively utilized.

(Embodiment 6)

Figure 23:
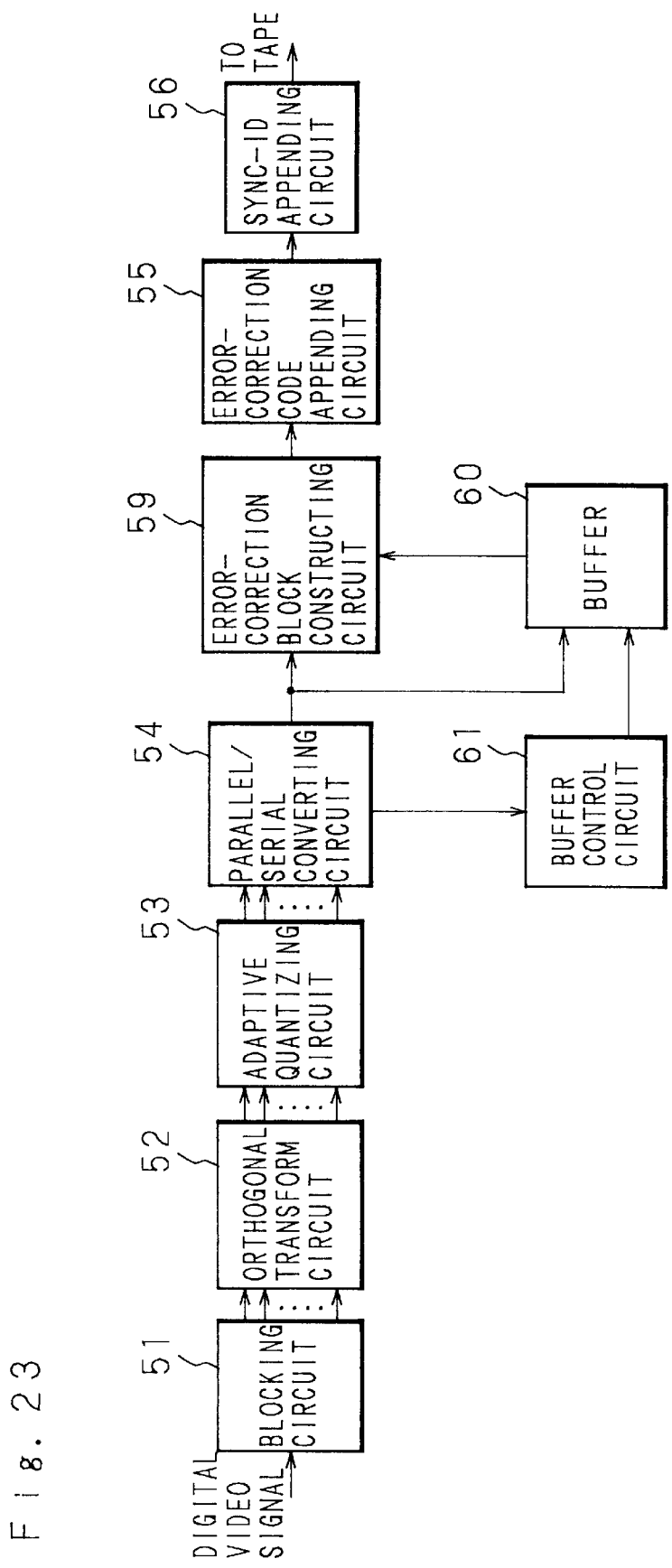
FIG. 23 is a block diagram showing the configuration of a video signal recording and reproducing apparatus according to a sixth embodiment of the invention.

The fifth embodiment has the configuration shown in FIG. 19, but it will be recognized that the configuration may be modified as shown in FIG. 23. In FIG. 23, the reference numerals 51 through 56, 59, and 60 designate exactly the same parts as those described in the fifth embodiment. The reference numeral 61 shows a buffer control circuit which performs control so that only low-frequency coefficients are written into the buffer 60.

In operation, as in the fifth embodiment, the input video signal for one field is divided by the blocking circuit 51 into blocks each including N pixels in both the horizontal and vertical directions. The orthogonal transform circuit 52 carries out orthogonal transform, and the adaptive quantizing circuit 53 determines the class on the basis of the AC component power of each block and quantizes each coefficient with the number of quantization levels based on the determined class, to compress the information amount of the video signal. The adaptive-quantized coefficients of each block, along with a coefficient for identifying the class of the block, are converted by the parallel/serial converting circuit 54 into serial form.

The adaptive-quantized coefficients for one field are then fed to the error-correction block constructing circuit 59 which inserts them in a rectangular block of k1×k2 words in the same order as in the fifth embodiment (FIG. 21). In the meantime, the buffer control circuit 61 performs control so that, of the adaptive-quantized coefficients for one field, only the low-frequency coefficients are stored in the buffer 60. When the adaptive-quantized coefficients for one field have been inserted into the rectangular block, then the low-frequency coefficients read from the buffer 60 are inserted starting from the immediately following line, to complete the formation of the information word.

The subsequent processing in the error-correction code appending circuit 55 and the sync-ID appending circuit 56 and the process sequence in the reproducing side are the same as those described in the fifth embodiment, and therefore, the description thereof is omitted herein.

As described, in the above arrangement, control is performed by the buffer control circuit 61 so that only the low-frequency coefficients are written into the buffer 60, whereas the reproducing process is the same as that in the fifth embodiment. It will be recognized that this arrangement provides the same effect as achieved in the fifth embodiment.

(Embodiment 7)

In the foregoing fifth and sixth embodiments, after the orthogonally-transformed video signal has been inserted into an information word, the low-frequency coefficients of the blocks are inserted in the order in which the blocks were orthogonally-transformed. However, if the low-frequency coefficients of the blocks are inserted in the order of the blocks according to increasing distance from the center of the screen, and the same processing as that of the fifth embodiment is performed for reproduction, the probability of detecting errors in the blocks in the center of the screen will be increased, making it possible to compensate for or correct the errors and thus reducing the effects of errors that cause degradation of image quality.

Figure 24:
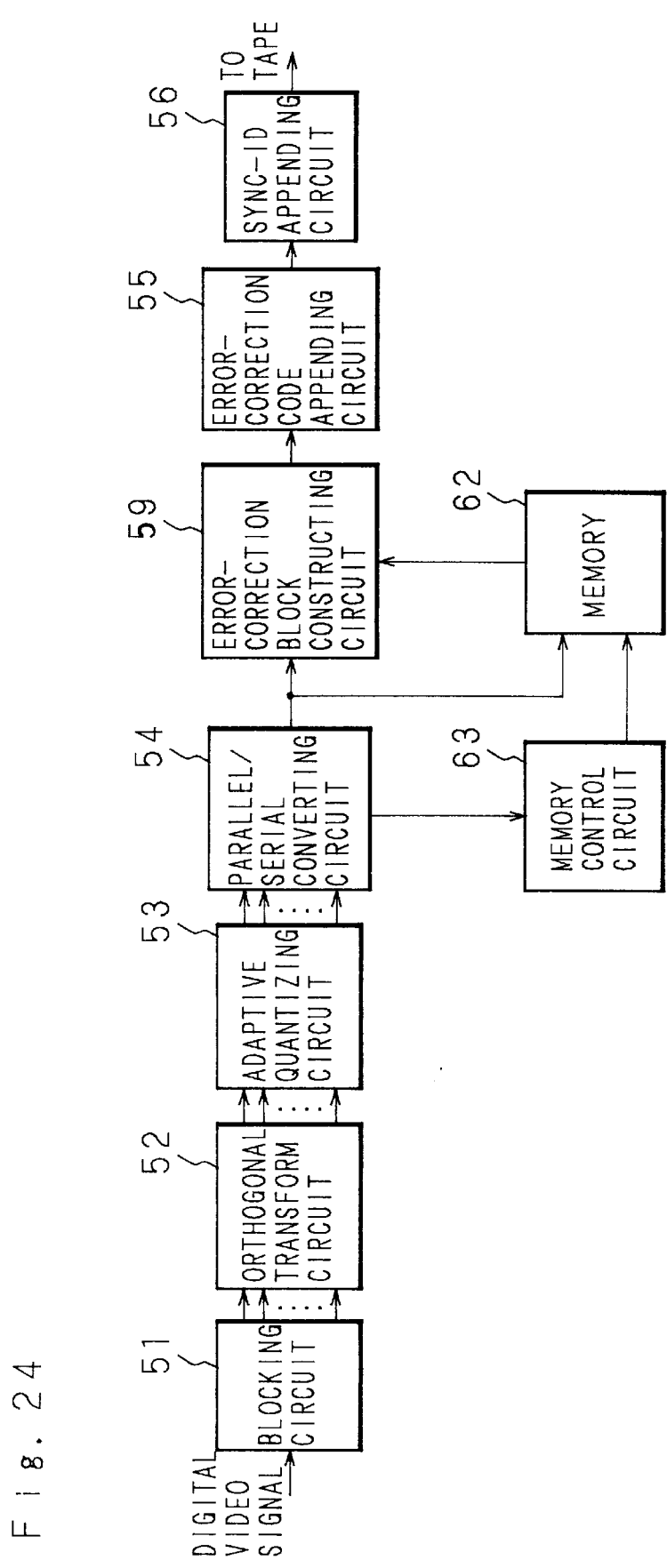
FIG. 24 is a block diagram showing the configuration of a video signal recording and reproducing apparatus according to a seventh embodiment of the invention.

The seventh embodiment of the invention employs such arrangement, which is described below with reference to FIG. 24. In FIG. 24, the reference numerals 51 through 56 and 59 designate exactly the same parts as those described in the fifth embodiment. The reference numeral 62 is a memory for temporarily storing low-frequency coefficients, and 63 is a memory control circuit which performs control so that only low-frequency coefficients are written into the memory 62 and so that the low-frequency coefficients are read out in the order of the blocks according to increasing distance from the center of the screen, i.e. starting with the block in the center of the screen and then moving through the blocks toward the periphery of the screen.

The operation of this embodiment will now be described. The operation from the blocking circuit 51 through the parallel/serial converting circuit 54 is the same as described in the fifth embodiment, and therefore, the description thereof is omitted herein. The error-correction block constructing circuit 59 inserts the adaptive-quantized coefficients for one field into a rectangular block of k1×k2 words in the same order as in the fifth embodiment (FIG. 21). In the meantime, the memory control circuit 63 performs control so that only the low-frequency coefficients are stored in the memory 62 in the order in which the blocks were orthogonally-transformed. When the adaptive-quantized coefficients for one field have been inserted into the rectangular block, then the low-frequency coefficients are read from the memory 62 into the error-correction block constructing circuit 59 in the order of the blocks according to increasing distance from the center of the screen (FIG. 25) under the control of the memory control circuit 63. The low-frequency coefficients thus read out are inserted starting from the immediately following line, as in the fifth embodiment, and constructed into an information word by the error-correction block constructing circuit 59.

The subsequent processing in the error-correction code appending circuit 55 and the sync-ID appending circuit 56 and the process sequence in the reproducing side are the same as those described in the fifth embodiment, and therefore, the description thereof is omitted herein.

Figure 25:
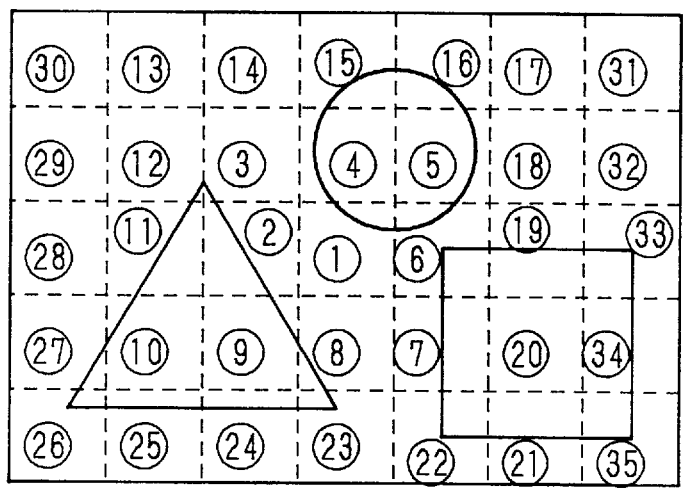
FIG. 25 is a diagram showing the sequence of selecting low-frequency coefficients in each block according to the seventh embodiment of the invention.

The order in which the blocks are selected when inserting the low-frequency coefficients in the information word is not limited to the example shown in FIG. 25, but any order can be employed to achieve the same effect as above, provided that the selection is made starting with the block in the center and then moving through the blocks toward the periphery of the screen.

(Embodiment 8)

In the foregoing sixth and seventh embodiments, low-frequency coefficients are added to the orthogonally-transformed video signal to form an information word, and the information word thus formed is coded with error-correction coding before recording. In an alternative arrangement, only the DC component of each block may be added more than one time to form an information word, or alternatively, only the low-frequency components of the blocks in the vicinity of the center of the screen may be added more than one time to form an information word.

Furthermore, in the sixth and seventh embodiments, the video signal for one field is orthogonally-transformed to obtain coefficients, and low-frequency coefficients are added to the obtained coefficients to form an information word. In an alternative arrangement, the video signal for one field is orthogonally-transformed, and the resulting coefficients are divided into sets of coefficients, each set being used to form an information word. In this arrangement, when the resulting information amount is smaller than the predetermined amount available for the information word, low-frequency coefficients may be further added to complete the information word.

Moreover, in an arrangement in which each low-frequency coefficient is added three or more times, the values of the reproduced low-frequency transform coefficients may be judged by majority logic to select the values of the low-frequency transform coefficients.

(Embodiment 9)

Figure 26:
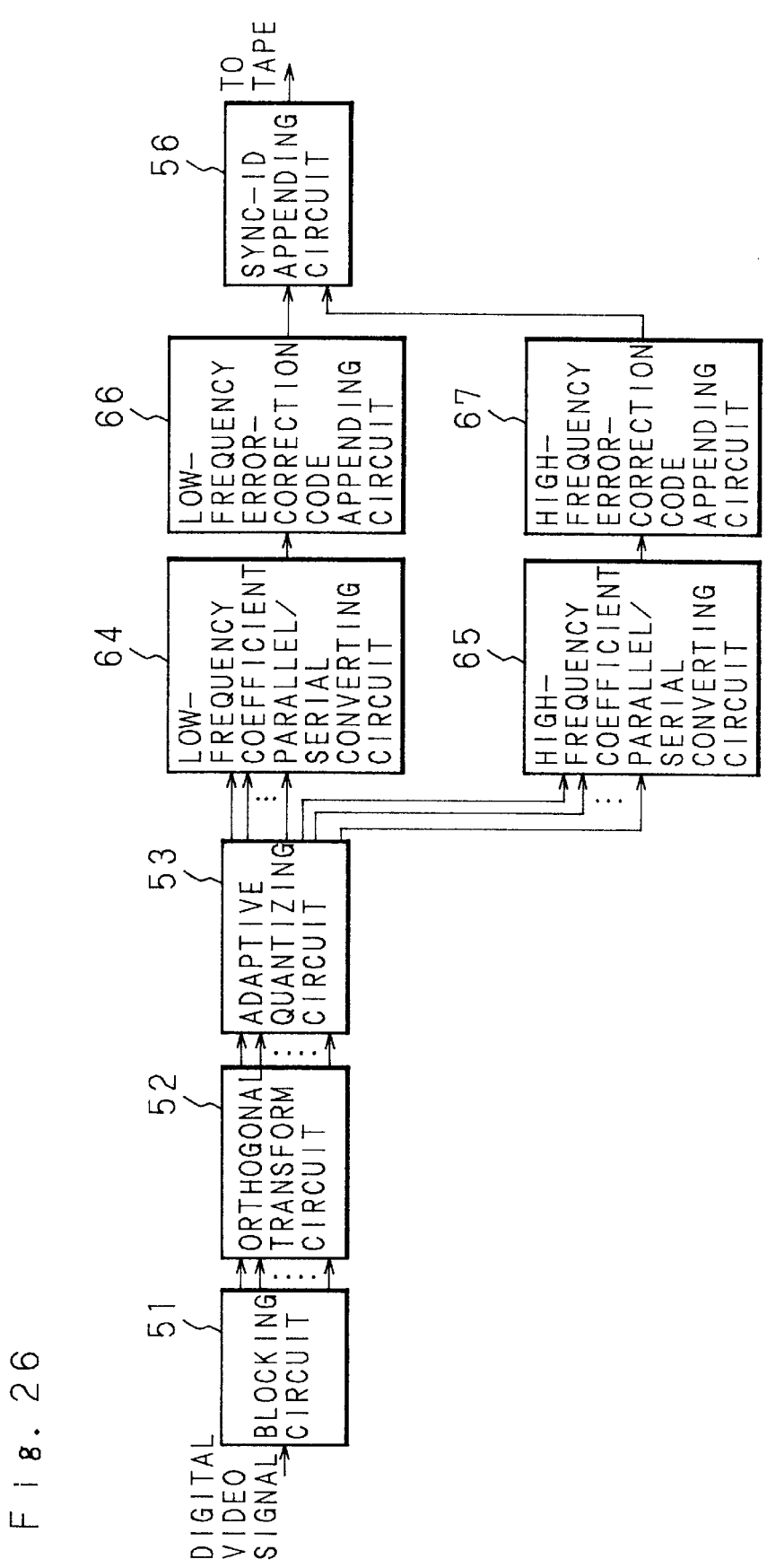
FIG. 26 is a block diagram showing the configuration of a video signal recording and reproducing apparatus according to a ninth embodiment of the invention.

A further embodiment of the invention will be described below with reference to FIG. 26 which shows the configuration of the embodiment. In FIG. 26, the reference numerals 51 through 53 and 56 designate exactly the same parts as those in the fifth embodiment. The adaptive quantizing circuit 53 adaptively quantizes the coefficients, of which the low-frequency coefficients are supplied to a low-frequency coefficient parallel/serial converting circuit 64 and the high-frequency coefficients to a high-frequency coefficient parallel/serial converting circuit 65. The low-frequency coefficients are entered in parallel to the low-frequency coefficient parallel/serial converting circuit 64 which outputs them in serial form to supply to a low-frequency coefficient error-correction code appending circuit 66. On the other hand, the high-frequency coefficients are entered in parallel to the high-frequency coefficient parallel/serial converting circuit 65 which outputs them in serial form to supply to a high-frequency coefficient error-correction code appending circuit 67. In the low-frequency coefficient error-correction code appending circuit 66, the low-frequency coefficients entered in serial form are divided in units of k words to form an information word, to which a check word of (n1−k) words is appended; the resulting data is then transferred to the sync-ID appending circuit 56. In the high-frequency coefficient error-correction code appending circuit 67, the high-frequency coefficients entered in serial form are divided in units of k words to form an information word, to which a check word of (n2−k) words is appended (where n1−k>n2−k); the resulting data is then transferred to the sync-ID appending circuit 56.

The operation of this embodiment will now be described. As in the fifth embodiment, the input digital video signal for one field is divided by the blocking circuit 51 into blocks each including N pixels in both the horizontal and vertical directions, and the blocks are supplied one by one to the orthogonal transform circuit 51. The orthogonal transform circuit 52 carries out the orthogonal transform of each block to obtain coefficients. The adaptive quantizing circuit 53 determines the class for each block on the basis of the AC component power of the block, and quantizes each coefficient with the number of quantization levels based on the determined class, to compress the information amount of the video signal. The adaptive-quantized coefficients of each block are separated into an information sequence Im of low-frequency coefficients and an information sequence Ih of high-frequency coefficients. The low-frequency coefficients, along with a coefficient for identifying the class of the block, are fed to the low-frequency coefficient parallel/serial converting circuit 64 for conversion into serial form, while the high-frequency coefficients are fed to the high-frequency coefficient parallel/serial converting circuit 65 for conversion into serial form.

The low-frequency information sequence Im outputted serially from the low-frequency coefficient parallel/serial converting circuit 64 is divided in units of k words to form an information word. In the low-frequency coefficient error-correction code appending circuit 66, a check word of (n1−k) words is appended to each information word to effect error-correction coding. Similarly, the high-frequency information sequence Ih outputted serially from the high-frequency coefficient parallel/serial converting circuit 65 is divided in units of k words to form an information word. In the high-frequency coefficient error-correction code appending circuit 67, a check word of (n2−k) words is appended to each information word to effect error-correction coding.

Figure 27:
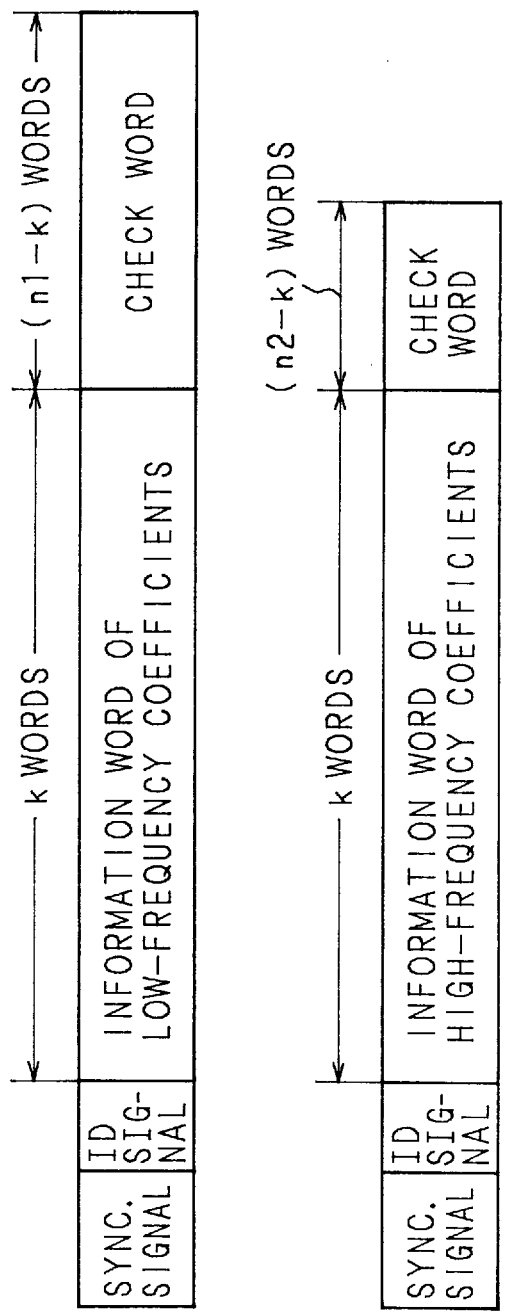
FIG. 27 is a diagram showing the structures of a low-frequency and a high-frequency codeword according to the ninth embodiment of the invention.

The sync-ID appending circuit 56 appends a synchronizing signal and an ID signal to each low-frequency coefficient error-correction codeword as well as to each high-frequency coefficient error-correction codeword, the ID signal being used to identify whether the error-correction codeword is for low-frequency or high-frequency coefficients. FIG. 27 shows the low-frequency and high-frequency error-correction codewords with the synchronizing and ID signals appended to them. These signals are modulated for recording on tape.

The reproduced signal is separated into the information sequence Im of low-frequency coefficients and the information sequence Ih of high-frequency coefficients in accordance with the ID signal. Error-detection and error-correction are carried out on the low-frequency and high-frequency information sequences by using the check words appended thereto during recording, after which the information sequences are reassembled and undergo adaptive dequantization and inverse orthogonal transform, to reproduce the original video signal.

As described, according to this embodiment, after the information amount is compressed by high-efficiency encoding means employing the technique of orthogonal transform, the video signal is divided into the information sequence Im of low-frequency coefficients and the information sequence of Ih of high-frequency coefficients, the low-frequency information sequence Im and the high-frequency information sequence Ih are each divided in units to k words to form an information word, and a check word of (n1−k) words is appended to each low-frequency information word and a check word of (n2−k) words to each high-frequency information word, where n1−k>n2−k. This configuration provides the low-frequency coefficients with a greater minimum distance than that of the high-frequency coefficients, which serves to increase the probability of detecting or correcting errors occurring in the low-frequency coefficients under the condition of a constant recording rate, thereby preventing appreciable degradation of image quality.

(Embodiment 10)

Figure 28:
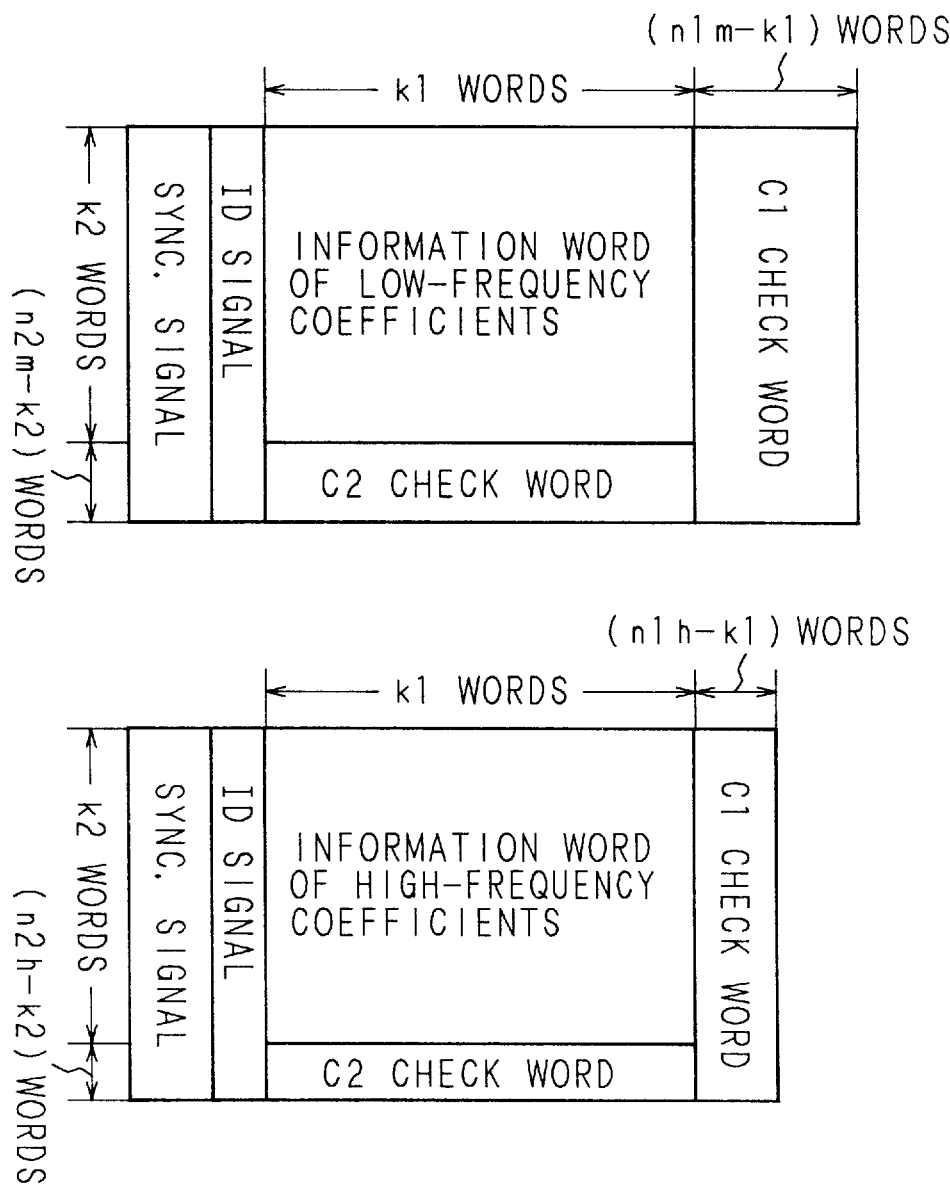
FIG. 28 is a diagram showing the structures of a low-frequency and a high-frequency codeword according to a tenth embodiment of the invention.

In the ninth embodiment, the codewords are constructed as shown in FIG. 27, but it will be recognized that, using the same configuration as shown in FIG. 26, the codewords may be constructed as shown in FIG. 28, to achieve the same effect as described above.

The operation of this alternative embodiment will be described below. As in the foregoing ninth embodiment, the information amount of the input video signal for one field is compressed by high-efficiency encoding means employing the technique of orthogonal transform, and the compressed video signal is then divided into an information sequence Im of low-frequency coefficients and an information sequence Ih of high-frequency coefficients.

The low-frequency information sequence Im is arranged into a rectangular block of k1×k2 words to form an information word. The low-frequency error-correction code appending circuit 66 C2-encodes the information word in column direction to append a C2 check word of (n2m–k2) words, and then C1-encodes the information word and the C2 check word in row direction to append a C1 check word of (n1m–k1) words, thus completing the error-correction coding of the data. Likewise, the high-frequency information sequence Ih is arranged into a rectangular block of k1×k2 words to form an information word. The high-frequency error-correction code appending circuit 67 C2-encodes the information word in column direction to append a C2 check word of (n2h–k2) words, and then C1-encodes the information word and the C2 check word in row direction to append a C1 check word of (n1h–k1) words, thus completing the error-correction coding of the data. The minimum distance in the error-correction code is given as (n1m–k1+1)×(n2m–k2+1) for the low-frequency information sequence Im and (n1h–k1+1)×(n2h–k2+1) for the high-frequency information sequence Ih. For the minimum distance in the low-frequency code to be greater than that in the high-frequency code, (n1m–k1+1)×(n2m–k2+1) >(n1h–k1+1)×(n2h–k2+1) should be satisfied.

The subsequent processing in the sync-ID appending circuit 56 and the operation of the reproducing side are the same as described in the ninth embodiment, and therefore, the description thereof is omitted herein.

The amount of information contained in the information sequence is not always the same between the low-frequency and high-frequency coefficients. In the ninth and tenth embodiments, therefore, the total count of low-frequency and high-frequency information words may be changed according to their respective information amounts. Furthermore, the number of information words per field may be the same or different between the low-frequency and high-frequency coefficients.

(Embodiment 11)

Figure 29:
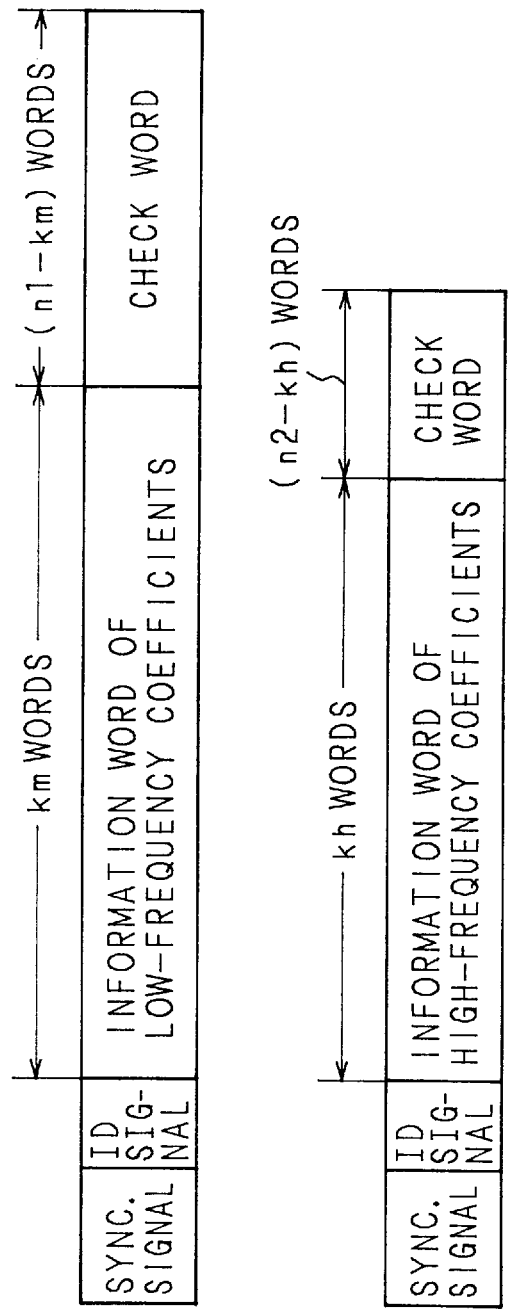
FIG. 29 is a diagram showing the structures of a low-frequency and a high-frequency codeword according to an eleventh embodiment of the invention.

In the foregoing ninth and tenth embodiments, the low-frequency and high-frequency information words are both constructed with the same word length. In an alternative arrangement, the low-frequency and high-frequency information words may be constructed with different word lengths, as shown in FIG. 29. Such arrangement accomplishes the same effect as achieved in the ninth embodiment, provided that the respective information sequences are encoded so that the minimum distance in the low-frequency code becomes greater than that in the high-frequency code.

(Embodiment 12)

In the ninth through eleventh embodiments, after the input video signal is processed through high-efficiency encoding means employing the technique of orthogonal transform for compression of the information amount, the compressed video signal is divided into the information sequence Im of low-frequency coefficients and the information sequence Ih of high-frequency coefficients, and error-correction coding is performed on each information sequence so that the minimum distance in the error-correction code of the low-frequency coefficients becomes greater than that of the high-frequency coefficients. In an alternative embodiment, the configuration shown in FIG. 30 is employed which also provides the same effect as achieved in the ninth embodiment.

Figure 30:
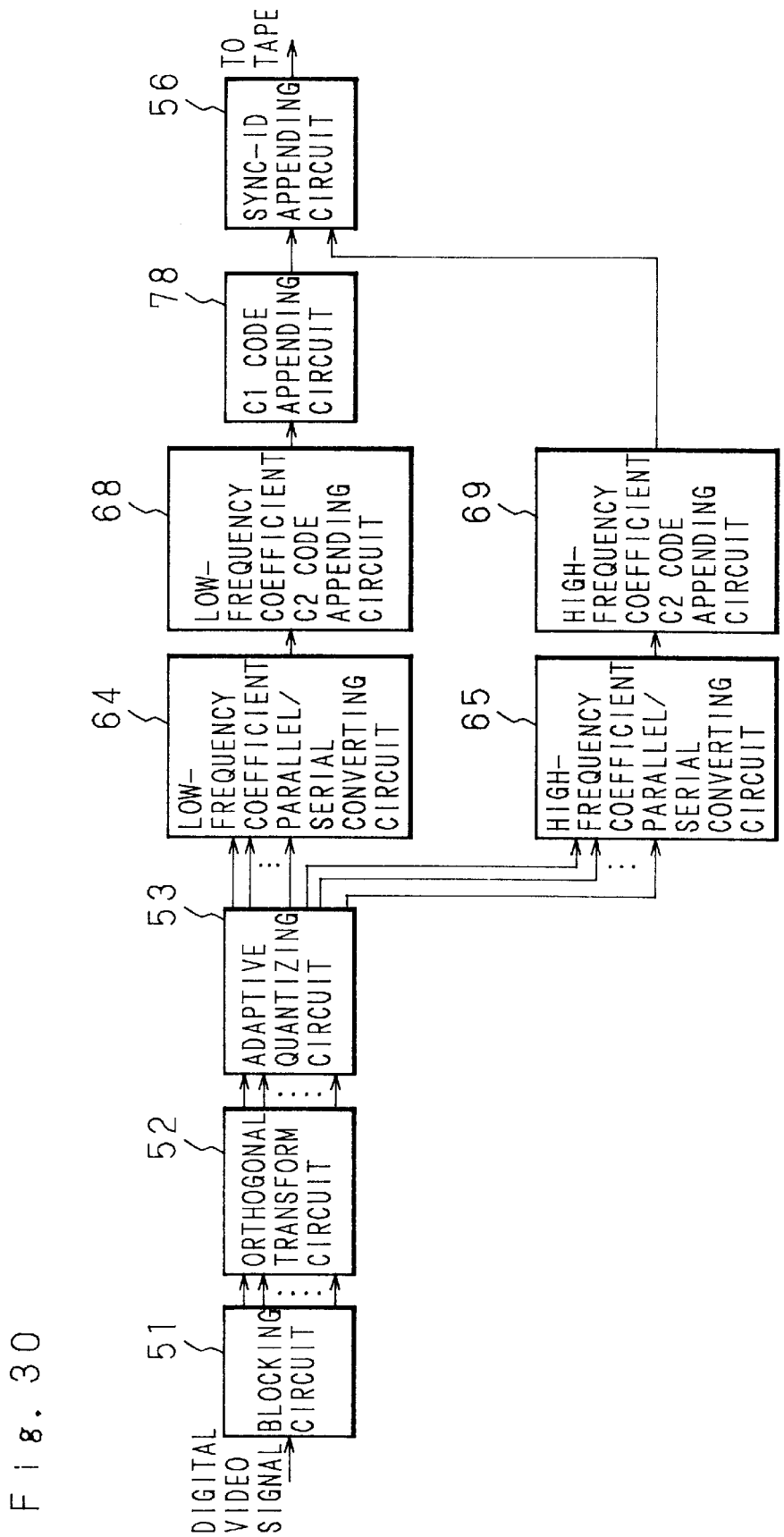
FIG. 30 is a block diagram showing the configuration of a video signal recording and reproducing apparatus according to a twelfth embodiment of the invention.

In FIG. 30, the reference numerals 51 through 53, 56, 64, and 65 designate exactly the same parts as those in the ninth embodiment. The low-frequency coefficient parallel/serial converting circuit 64 converts the information sequence of low-frequency coefficients into serial form and supplies it to a low-frequency coefficient C2 code appending circuit 68. The low-frequency coefficient C2 code appending circuit 68 divides the supplied information sequence of low-frequency coefficients in units of k1 words to form an information word, appends a C2 check word of (n1–k1) words to the information word, encodes it with a Reed-Solomon error-correction code, and supplies the resulting codeword to a C1 code appending circuit 78. In the C1 code appending circuit 78, the encoded low-frequency information sequence Im is arranged in k2 rows and encoded with Reed-Solomon error-correction code, with a C1 check word of (n2–k2) words being appended in column direction. The resulting codeword is supplied to the sync-ID appending circuit 56. On the other hand, the high-frequency coefficient parallel/serial converting circuit 65 converts the information sequence of high-frequency coefficients into serial form and supplies it to a high-frequency coefficient C2 code appending circuit 69. The high-frequency coefficient C2 code appending circuit 69 divides the supplied information sequence of high-frequency coefficients in units of k1 words to form an information word, and appends a C2 check word of (n1–k1) words to the information word, thus encoding with Reed-Solomon error-correction code. The resulting codeword is then supplied to the sync-ID appending circuit 56.

The operation of this embodiment will now be described. As in the ninth embodiment, the information amount of the input video signal for one field is compressed by high-efficiency encoding means employing the technique of orthogonal transform, and the compressed video signal is divided into an information sequence Im of low-frequency coefficients and an information sequence Ih of high-frequency coefficients.

Figure 31:
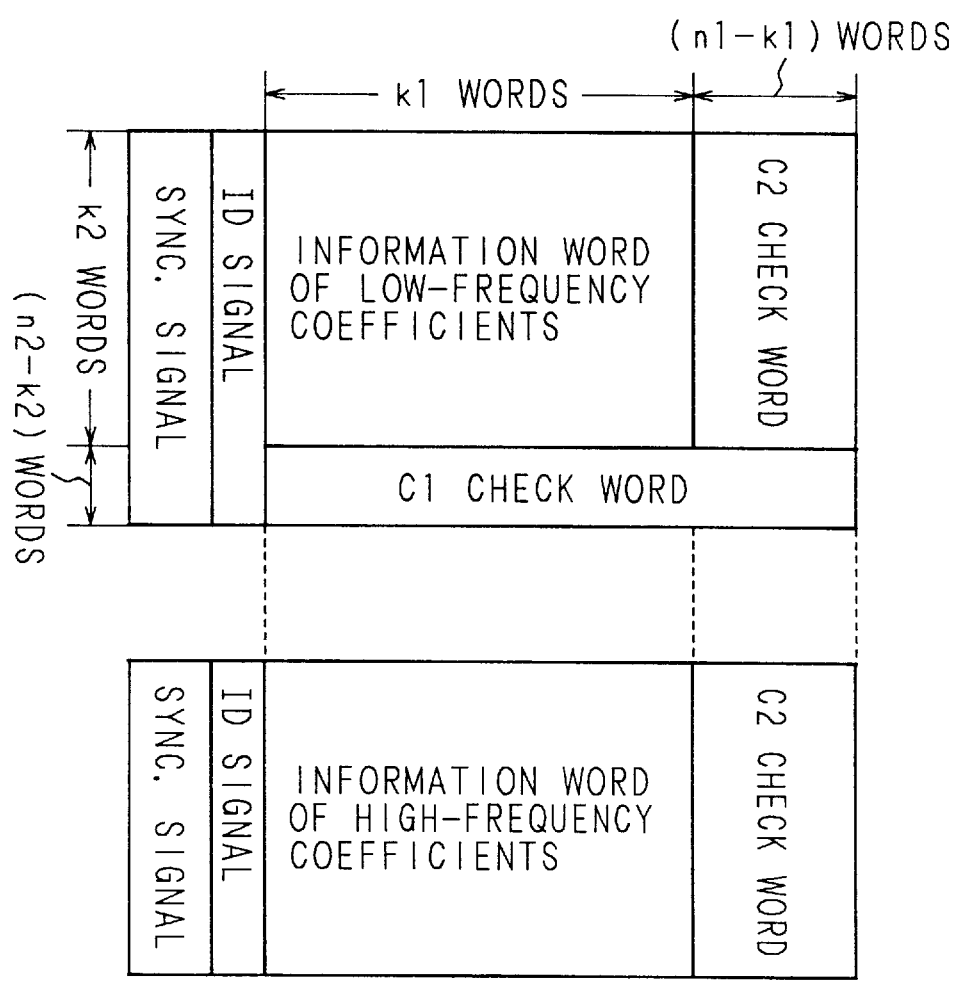
FIG. 31 is a diagram showing the structures of a low-frequency and a high-frequency codeword according to the twelfth embodiment of the invention.

The low-frequency information sequence Im and the high-frequency information sequence Ih are each divided in units of k1 words to form an information word. Each low-frequency information word is error-correction coded with a C2 check word of (n1–k1) words being appended to it by the low-frequency coefficient C2 code appending circuit 68, while on the other hand, each high-frequency information word is error-correction coded with a C2 check word of (n1–k1) words being appended to it by the high-frequency coefficient C2 code appending circuit 69. Furthermore, for the low-frequency information sequence Im, n1-word codewords produced by the low-frequency C2 code appending circuit 68 are arranged in k2 rows and are error-correction coded with a C1 check word of (n2–k2) words being appended to them by the C1 code appending circuit 78 (FIG. 31).

The subsequent processing in the sync-ID appending circuit 56 and the operation of the reproducing side are the same as those in the ninth embodiment, and therefore, the description thereof is omitted herein.

When the information sequence Im of low-frequency coefficients and the information sequence Ih of high-frequency coefficients are encoded as described above, the low-frequency information sequence Im is double-encoded using both C1 and C2 codes, whereas the high-frequency information sequence Ih is encoded using only C2 code. This provides the information word of the low-frequency information sequence Im with a greater error-correction or error-detection ability than that of the information word of the high-frequency information sequence Ih, thus accomplishing the same effect as achieved in the ninth embodiment.

The above description has dealt with an example in which the low-frequency and high-frequency information words are both constructed with the same word length, but it will be appreciated that they may be constructed with different word lengths. In the latter case, the low-frequency information sequence Im is divided in units of k1 words to form an information word which is then error-correction coded with a C2 check word of (n1−k1) words appended to it; after that, the resulting n1-word codewords are arranged in k2 rows and C1-encoded in column direction, and a C1 check word of (n2−k2) words is appended. On the other hand, the high-frequency information sequence Ih is divided in units of kh words to form an information word and error-correction coded with a C2 check word of (nh−kh) words appended to it. In this case also, the low-frequency information word has a greater error-correction ability than the high-frequency information word, thus accomplishing the same effect as achieved in the ninth embodiment.

(Embodiment 13)

Figure 32:
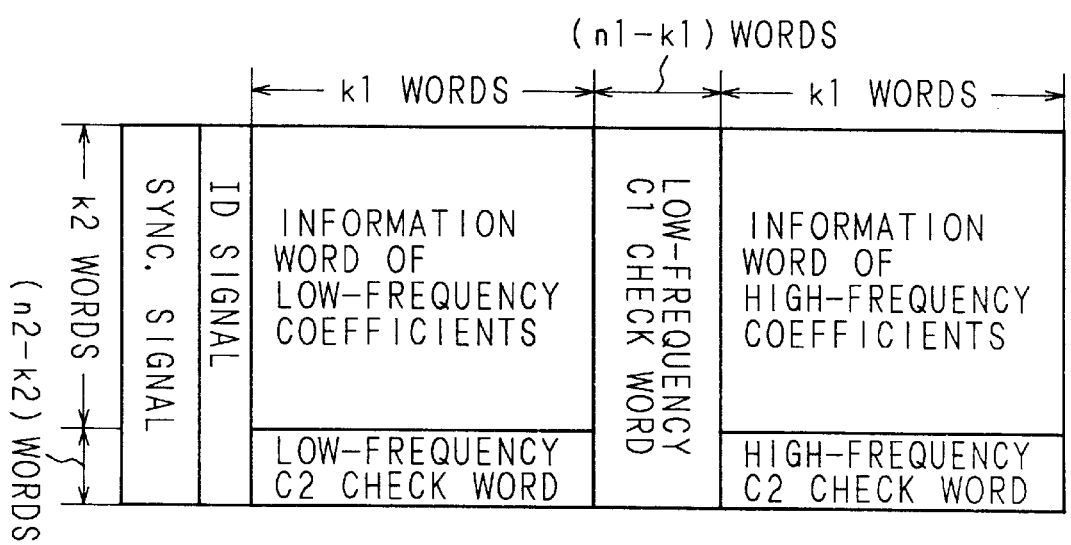
FIG. 32 is a diagram showing the structure of a codeword according to a thirteenth embodiment of the invention.

In another alternative embodiment, the error-correction codeword may be constructed as shown in FIG. 32. In this case also, when the information sequence Im of low-frequency coefficients and the information sequence Ih of high-frequency coefficients are encoded as described in the twelfth embodiment, the low-frequency information sequence Im is double-encoded with both C1 and C2 codes, whereas the high-frequency information sequence Ih is encoded with C2 codes only. This serves to provide the information word of the low-frequency information sequence Im with a greater error-correction or error-detection ability than that of the information word of the high-frequency information sequence Ih, thereby accomplishing the same effect as achieved in the ninth embodiment.

The operation of this embodiment will now be described. The information sequence Im of low-frequency coefficients and the information sequence Ih of high-frequency coefficients are each arranged into a rectangular block of k1×k2 words to form an information word. In the low-frequency coefficient C2 code appending circuit 68, the low-frequency information word is C2-encoded in the column direction and a C2 check word of (n2−k2) words is appended. On the other hand, in the high-frequency coefficient C2 code appending circuit 69, the high-frequency information word is C2-encoded in the column direction and a C2 check word of (n2−k2) words is appended. Furthermore, for the low-frequency information sequence Im, the C1 code appending circuit 78 C1-encodes the low-frequency information word and the C2 check word in the row direction and appends a C1 check word of (n1−k1) words. The low-frequency information word, the C1 check word, and the C2 check word together form a low-frequency error-correction block, and the high-frequency information word and C2 check words together form a high-frequency error-correcting block.

The sync-ID appending circuit 56 assembles the low-frequency and high-frequency error-correction blocks into a single error-correction block, and appends a synchronizing signal and an ID signal to each row of the error-correction block to form an error-correction codeword as shown in FIG. 32. Thereafter, the error-correction codeword is sequentially read in rows and modulated for recording on tape.

Alternatively, the low-frequency information sequence Im constructed into an information word of k1×k2 words may be encoded in two mutually perpendicular directions, and the high-frequency information sequence Ih may be divided in units of kh words (kh≠k1 or kh≠k2) to form an information word which is then encoded. In this case also, the low-frequency information word has a greater error-correction ability, so that the same effect as in the ninth embodiment can be achieved.

(Embodiment 14)

Figure 33:
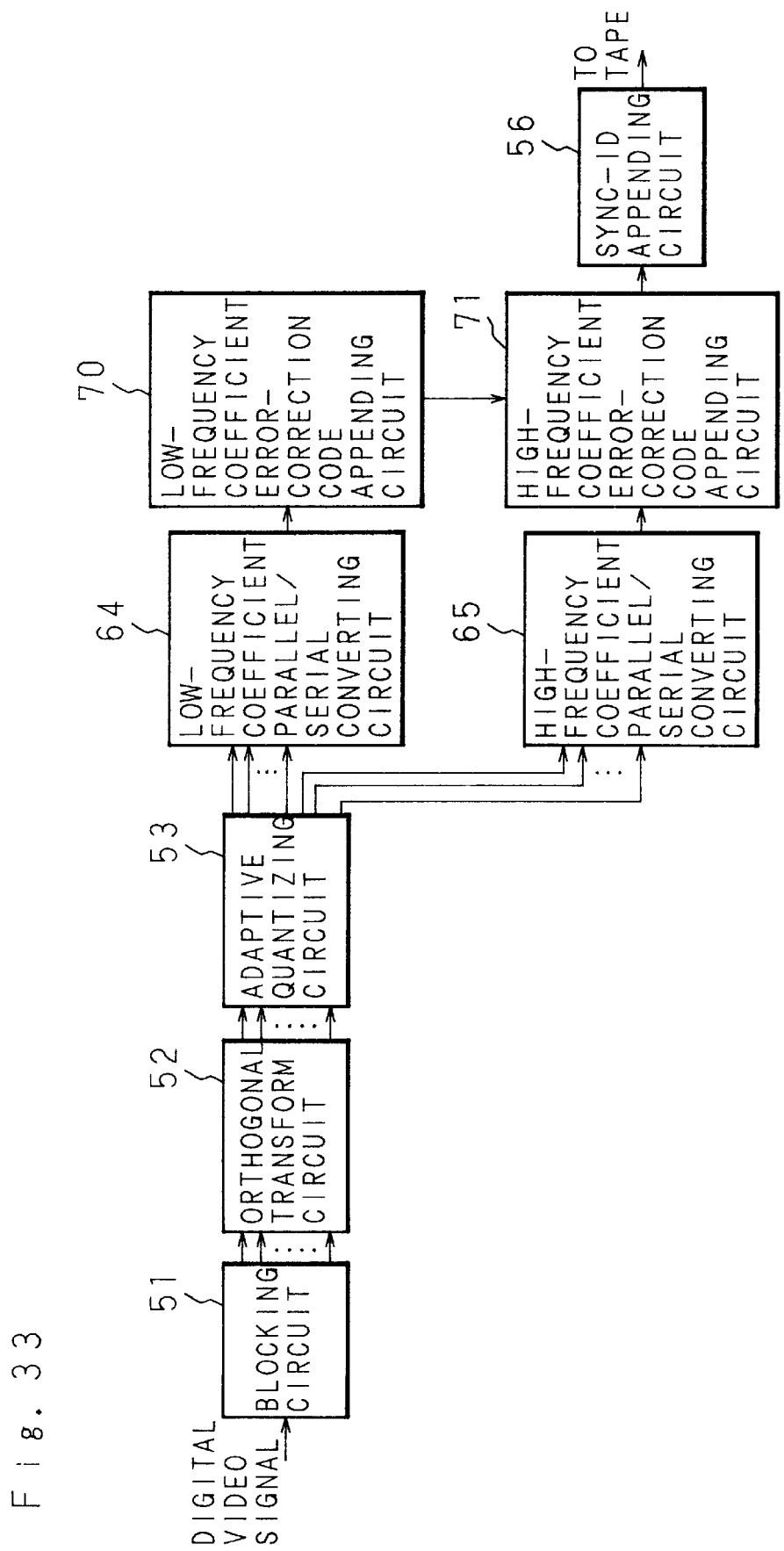
FIG. 33 is a block diagram showing the configuration of a video signal recording and reproducing apparatus according to a fourteenth embodiment of the invention.

Alternative to the configurations in the ninth through thirteenth embodiments, the configuration shown in FIG. 33 may be employed which also provides the same effect as achieved in the foregoing embodiments. In FIG. 33, the reference numerals 51 through 53, 56, 64, and 65 designate exactly the same parts as those in the ninth embodiment. In the fourteenth embodiment illustrated in FIG. 33, the low-frequency coefficient parallel/serial converting circuit 64 converts the information sequence Im of low-frequency coefficients into serial form and supplies it to a low-frequency coefficient error-correction code appending circuit 70. The low-frequency coefficient error-correction code appending circuit 70 divides the supplied information sequence Im of low-frequency coefficients in units of k1 words to form an information word, appends a check word of (n1−k1) words to the information word, encodes it with a Reed-Solomon error-correction code, and supplies the resulting codeword to a high-frequency coefficient error-correction code appending circuit 71. On the other hand, the high-frequency coefficient parallel/serial converting circuit 65 converts the information sequence Ih of high-frequency coefficients into serial form and supplies it to a high-frequency coefficient error-correction code appending circuit 71. The high-frequency coefficient error-correction code appending circuit 71 divides the supplied information sequence Ih of high-frequency coefficients in units of k1 words to form an information word, and appends a check word of (n2−n1−k1) words to an information word created by combining the high-frequency information word with the low-frequency information word encoded by the low-frequency coefficient error-correction code appending circuit 70, thus encoding with a Reed-Solomon error-correction code. The resulting codeword is then supplied to the sync-ID appending circuit 56.

The operation of this embodiment will now be described. As in the ninth embodiment, the information amount of the input video signal for one field is compressed by high-efficiency encoding means employing the technique of orthogonal transform, and the compressed video signal is then divided into an information sequence Im of low-frequency coefficients and an information sequence Ih of high-frequency coefficients.

The low-frequency information sequence Im is divided in units of k1 words to form a low-frequency information word. Each low-frequency information word is error-correction coded with a check word of (n1−k1) words being appended to it by the low-frequency coefficient error-correction code appending circuit 70. Likewise, the high-frequency information sequence Ih is divided in units of k1 words to form a high-frequency information word. The high-frequency information word and the low-frequency information word encoded by the low-frequency coefficient error-correction code appending circuit 70 are combined together to form a single information word. This information word is error-correction coded with a check word of (n2−n1−k1) words being appended by the high-frequency coefficient error-correction code appending circuit 71.

Figure 34:
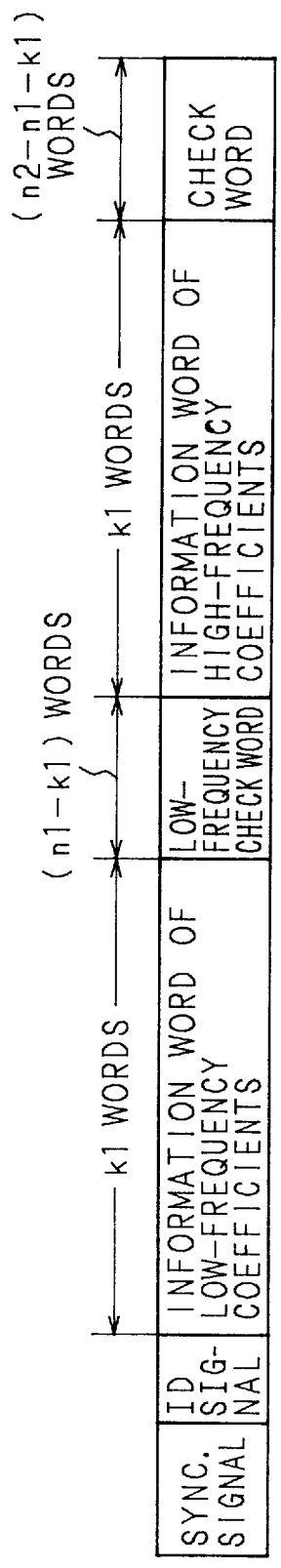
FIG. 34 is a diagram showing the structure of a codeword according to the fourteenth embodiment of the invention.

Thereafter, the sync-ID appending circuit 56 appends a synchronizing signal and an ID signal to each of the codewords produced by the low-frequency coefficient error-correction code appending circuit 70 and the high-frequency coefficient error-correction code appending circuit 71. FIG. 34 shows the structure of the codeword with the synchronizing and ID signals appended to it. These signals are modulated and recorded on tape.

In the reproducing process, the synchronizing signal is extracted from the replayed signal, and based on this synchronizing signal, each codeword is separated from the other. Using the check word for each codeword, errors in the low-frequency and high-frequency information words as well as errors in the low-frequency check word are corrected. After that, using the low-frequency check word, errors in the low-frequency information word are further corrected. Thereafter, the low-frequency and high-frequency information sequences are reassembled together and undergo adaptive dequantization and inverse orthogonal transform to reproduce the original video signal.

In this embodiment, the information sequence Im of low-frequency coefficients and the information sequence Ih of high-frequency coefficients are respectively encoded as described above, and in the decoding process, errors in the low-frequency information word and the check word appended to it and errors in the high-frequency information word are corrected using the check word of (n2−n1−k1) words, after which errors in the low-frequency information word are further corrected using the check word of (n1−k1) words. As a result, the low-frequency information word has a greater error-correction ability than the high-frequency information word, thus accomplishing the same effect as achieved in the ninth embodiment.

Figure 35:
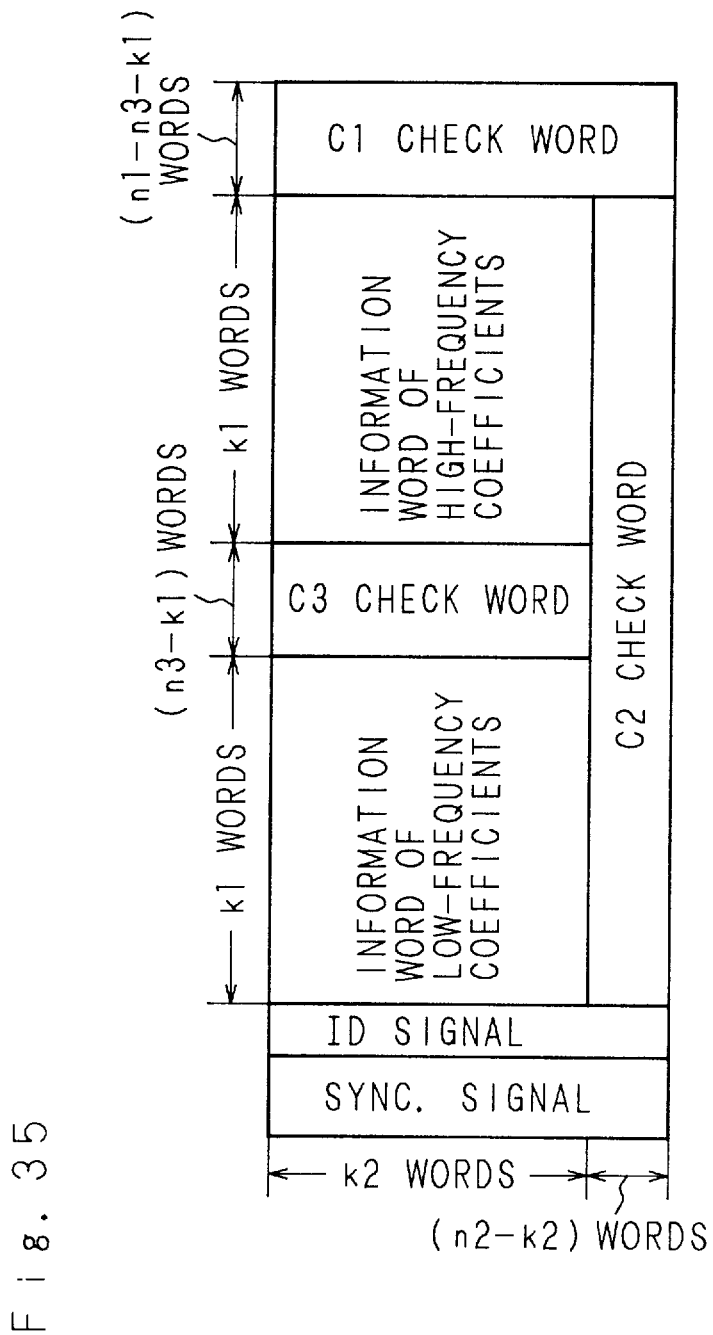
FIG. 35 is a diagram showing the structure of another codeword according to the fourteenth embodiment of the invention.

Furthermore, the codeword may be constructed as shown in FIG. 35, which not only accomplishes the same effect as achieved in the ninth embodiment but serves to reduce the susceptibility to the effects of errors.

The operation of this example will be described below. The compressed video signal is divided into an information sequence Im of low-frequency coefficients and an information sequence Ih of high-frequency coefficients, as in the thirteenth embodiment. The low-frequency information sequence Im is arranged into a rectangular block of k1×k2 words to form a low-frequency information word. In the low-frequency coefficient error-correction code appending circuit 70, each low-frequency information word is C3-encoded in the row direction, to which a C3 check word of (n3−k1) words is appended. The high-frequency information sequence Ih is also arranged into a rectangular block of k1×k2 words to form a high-frequency information word. This high-frequency information word and the low-frequency information word encoded by the low-frequency coefficient error-correction code appending circuit 70 are combined together to form a single information word. In the high-frequency coefficient error-correction code appending circuit 71, this information word is C2-encoded in the row direction, to which a C2 check word of (n2−k2) words is appended; the information word is further C1-encoded in column direction, to which a C1 check word of (n1−n3−k1) words is appended.

Thereafter, the sync-ID appending circuit 56 appends a synchronizing signal and an ID signal to each of the codewords produced by the low-frequency coefficient error-correction code appending circuit 70 and the high-frequency coefficient error-correction code appending circuit 71. FIG. 35 shows the structure of the codeword with the synchronizing and ID signals appended to it. These signals are modulated and recorded on tape.

In the reproducing process, the synchronizing and ID signals are extracted from the replayed signal, and based on these synchronizing and ID signals, each codeword is separated from the other. Using the C1 and C2 check words, errors in the low-frequency and high-frequency information words as well as errors in the C3 check word are corrected. After that, using the C3 check word, errors in the low-frequency information word are further corrected. Thereafter, the low-frequency and high-frequency information sequences are reassembled together and undergo adaptive dequantization and inverse orthogonal transform to reproduce the original video signal.

In this example, the information sequence Im of low-frequency coefficients and the information sequence Ih of high-frequency coefficients are respectively encoded as described above, and in the decoding process, errors in the low-frequency information word and the C3 check word appended to it and errors in the high-frequency information word are corrected using the C1 and C2 check words, after which errors in the low-frequency information word are further corrected using the C3 check word. As a result, the low-frequency information word has a greater error-correction ability than the high-frequency information word, thus accomplishing the same effect as achieved in the ninth embodiment.

Figure 36:
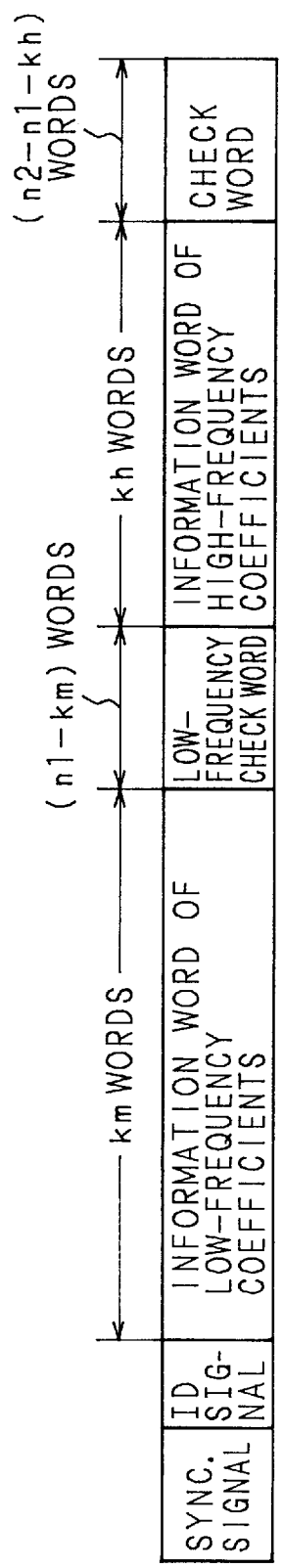
FIG. 36 is a diagram showing the structure of still another codeword according to the fourteenth embodiment of the invention.

It will be appreciated that the low-frequency and high-frequency information words need not necessarily be the same size but that, as shown in FIG. 36, the low-frequency and high-frequency information words may be constructed with different word lengths, km words and kh words, respectively. This also accomplishes the same effect.

(Embodiment 15)

In the foregoing embodiments ninth to fourteenth, the information amount of the input video signal is compressed by high-efficiency encoding means employing the technique of orthogonal transform, and the compressed video signal is then divided into high-frequency and low-frequency information sequences, after which error-correction coding is carried out so that the low-frequency information sequence Im has a greater minimum distance. In the fifteenth embodiment herein described, part of the low-frequency information sequence Im is constructed into a new information word, and a check word obtained by the error-correction coding of this information word is appended for recording. This also accomplishes the same effect as achieved in the ninth embodiment.

The operation of the fifteenth embodiment will now be described. As in the ninth embodiment, the information amount of the input digital video signal for one field is compressed by high-efficiency encoding means employing the technique of orthogonal transform, and the compressed video signal is divided into an information sequence Im of low-frequency coefficients and an information sequence Ih of high-frequency coefficients.

Figure 37:
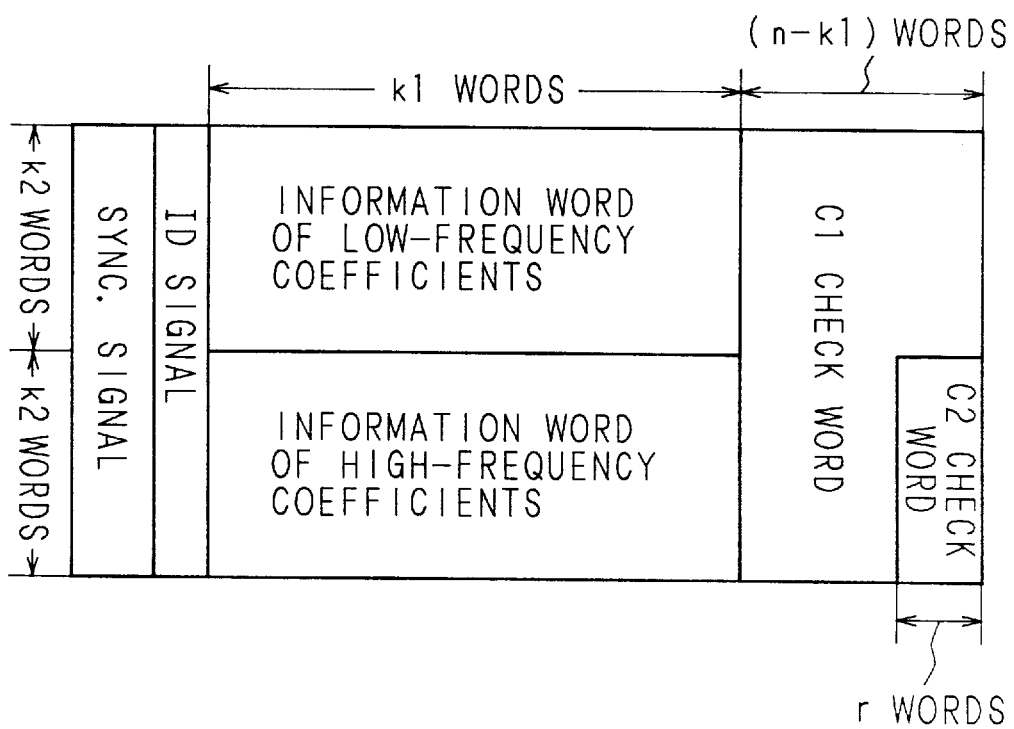
FIG. 37 is a diagram showing the structure of a codeword according to a fifteenth embodiment of the invention.

The low-frequency information sequence Im is divided in units of k1 words and arranged in k2 rows, and starting from the next row, the high-frequency information sequence Ih divided in units of k1 words is arranged in k2 rows, thus forming respective information words. Each of the information words is C1-encoded in the row direction, to which a C1 check word of (n−k1) words is appended. After that, an r-word area (r<n−k1) is erased from the C1 check word area for the high-frequency information sequence Ih. Part of the low-frequency information sequence Im is C2-encoded to obtain a C2 check word. The C2 check word is then inserted in the erased area to complete the structure shown in FIG. 37.

In decoding the thus structured codeword, the high-frequency information sequence Ih is subjected to C1-code error-correction with the erased area being treated as erasure, while the low-frequency information sequence Im is subjected first to C2 code error-correction and then to C1-code error-correction.

It will be recognized that the same effect as achieved in the ninth embodiment can be also accomplished by inserting other information in the erased area instead of the check word obtained by the error-correction coding of part of the low-frequency information sequence Im.

Furthermore, after the error-correction coding of the low-frequency and high-frequency information sequences, part of the low-frequency information sequence Im may be constructed into a new information word, and a check word obtained by error-correction coding may be appended to this information word. This also accomplishes the same effect as achieved in the ninth embodiment.

It will also be appreciated that the same effect can be obtained whether the low-efficiency and high-efficiency information words are constructed with the same word length or with different word lengths.

(Embodiment 16)

In the foregoing embodiments ninth to fifteenth, Reed-Solomon codes are used as the error-correcting codes, but it will be recognized that the same effect can be obtained if other error-correcting codes than Reed-Solomon code are used.

Also, in the foregoing embodiments, after the information amount of the input digital video signal for one field is compressed by high-efficiency encoding means employing the technique of orthogonal transform, the compressed video signal is divided into two information sequences, i.e. the information sequence Im of low-frequency coefficients and the information sequence Ih of high-frequency coefficients. However, it will be recognized that the same effect can be obtained if the compressed video signal is divided into three or more information sequences with a larger number of check words appended to a lower frequency information sequence for a greater minimum distance. In this case, the information word size need not necessarily be the same but may be different between the three or more information sequences.

(Embodiment 17)

Figure 38:
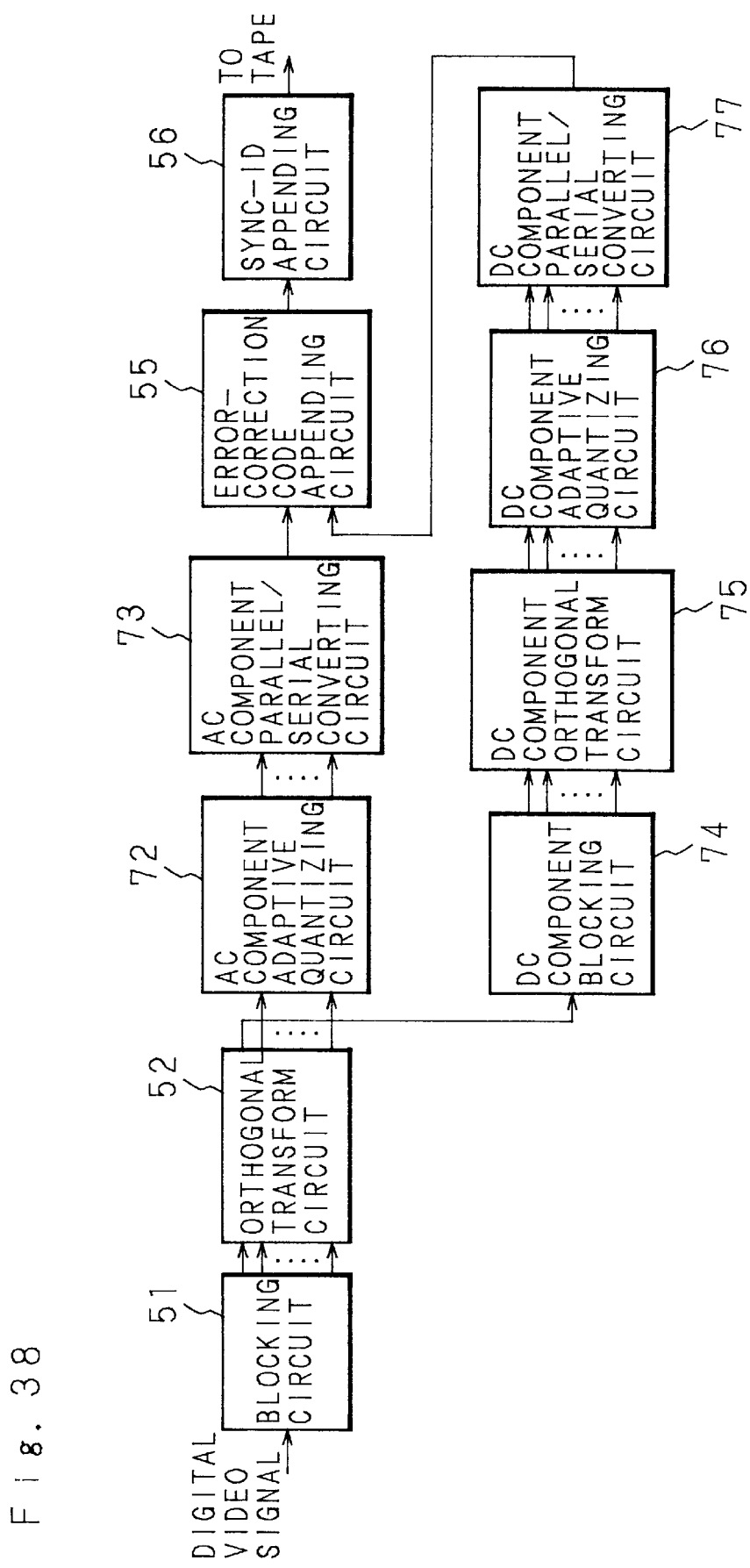
FIG. 38 is a block diagram showing the configuration of a video signal recording and reproducing apparatus according to a seventeenth embodiment of the invention.

Another alternative embodiment of the invention will be described below with reference to FIG. 38 which shows the configuration of this embodiment. In FIG. 38, the reference numerals 51, 52, 55, and 56 designate exactly the same parts as those described in the fifth embodiment. The orthogonal transform circuit 52 carries out the orthogonal transform of each block to obtain coefficients, and supplies AC component coefficients to an AC component adaptive quantizing circuit 72 and a DC component coefficient to a DC component blocking circuit 74. The AC component adaptive quantizing circuit 72 quantizes each of the transform coefficients, other than the DC transform coefficient, with a predetermined bit allocation, and supplies the adaptive-quantized coefficients to an AC component parallel/serial converting circuit 73. The AC component parallel/serial converting circuit 73 converts the adaptive-quantized coefficients, entered in parallel, into serial form, and supplies them to the error-correction code appending circuit 55. On the other hand, the DC component blocking circuit 74 arranges the supplied DC component coefficients into blocks each including N1 pixels (N1 is an integer) in both the horizontal and vertical directions, and supplies the blocks one by one to a DC component orthogonal transform circuit 75. The DC component orthogonal transform circuit 75 carries out the orthogonal transform of each block to obtain coefficients, and supplies the coefficients to a DC component adaptive quantizing circuit 76. The DC component adaptive quantizing circuit 76 quantizes each of the supplied coefficients with a predetermined bit allocation, and supplies the adaptive-quantized coefficients to a DC component parallel/serial converting circuit 77. The DC component parallel/serial converting circuit 77 converts the adaptive-quantized coefficients, entered in parallel, into serial form, and supplies them to the error-correction code appending circuit 55.

Figure 39:
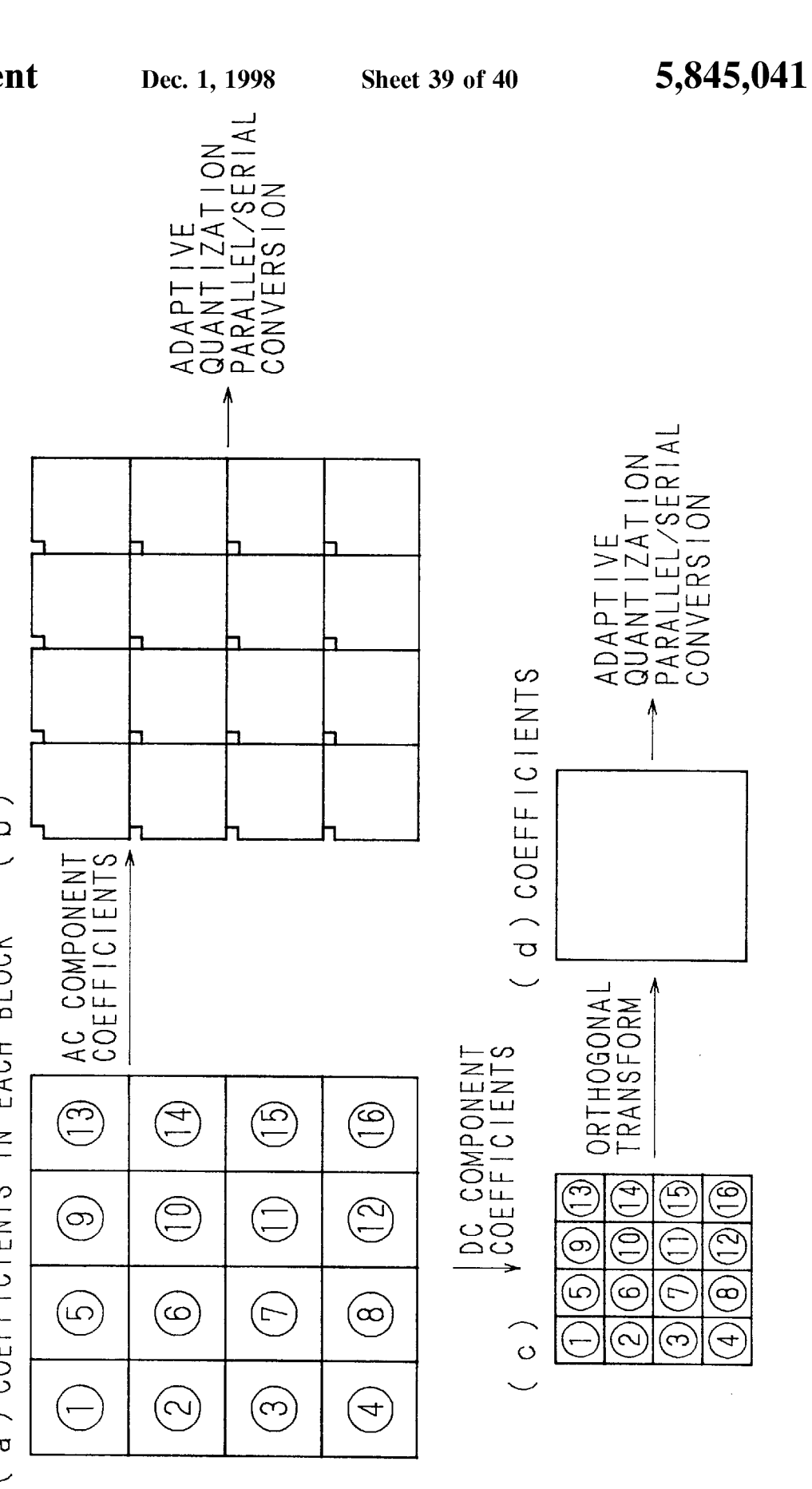
FIG. 39 is a diagram explaining the operation of the video signal recording and reproducing apparatus according to the seventeenth embodiment of the invention.

The operation of this embodiment will now be described with reference to FIGS. 38 and 39. The input digital video signal for one field (FIG. 9(a)) is divided by the blocking circuit 51 into blocks each including N pixels in both the horizontal and vertical directions (FIG. 9(b)), and the blocks are supplied one by one to the orthogonal transform circuit 52. The orthogonal transform circuit 52 carries out the orthogonal transform of each block to obtain coefficients (FIG. 39(a)). The coefficients obtained by the orthogonal transform circuit 52 are separated into DC component coefficients and other coefficients than the DC component (FIG. 39 (b),(c)).

The AC component adaptive quantizing circuit 72 classifies the blocks into a number of classes according to the AC component power, excluding the DC component of each block, allocates different numbers of quantization levels to the various frequency components of the block according to the determined class, and quantizes each coefficient, other than the DC component, using a quantization table that allocates a larger number of quantization levels to lower frequency components and a smaller number of quantization levels to higher frequency components, thus achieving the compression of the information amount of the video signal. The adaptive-quantized coefficients, along with a coefficient for identifying the class of the block, are converted into serial form by the AC component parallel/serial converting circuit 73.

On the other hand, the DC component coefficients obtained in each block by the orthogonal transform circuit 52 are arranged into blocks each including N1 pixels in both the horizontal and vertical directions in the DC component blocking circuit 74 (FIG. 39(c)), and the blocks are supplied one by one to the DC component orthogonal transform circuit 75. The DC component orthogonal transform circuit 75 carries out the orthogonal transform of each block to obtain coefficients (FIG. 39(d)). The DC component adaptive quantizing circuit 76 changes the quantization table according to the AC component power of each block and, using this quantization table, quantizes each of the coefficients obtained by the DC component orthogonal transform circuit 75, to compress the information amount of the video signal. The adaptive-quantized coefficients, along with a coefficient for identifying the class of the block, are converted into serial form by the DC component parallel/serial converting circuit 77.

The adaptive-quantized coefficients for one field are then constructed into a number of information words, encoded by the error-correction code appending circuit 55, appended with synchronizing and ID signals by the sync-ID appending circuit 56, and modulated for recording on tape.

At the reproducing side, the inverse processings from the recording side are executed to obtain the reproduced video signal.

As described, according to this embodiment, after the input video signal is divided into blocks of N×N pixels, the coefficients obtained by the orthogonal transform of each block are separated into the DC component coefficient and other components than the DC component, after which the coefficients other than the DC component are adaptively quantized, while on the other hand, the DC component coefficients are arranged into blocks of N1×N1 pixels, each block then being orthogonal-transformed to obtain coefficients which are then adaptively quantized, thus accomplishing the compression of the information amount of the video signal. Therefore, this configuration achieves a higher data compression ratio as compared with the high-efficiency encoding means constructed to compress the information amount by a single orthogonal transform.

Figure 40:
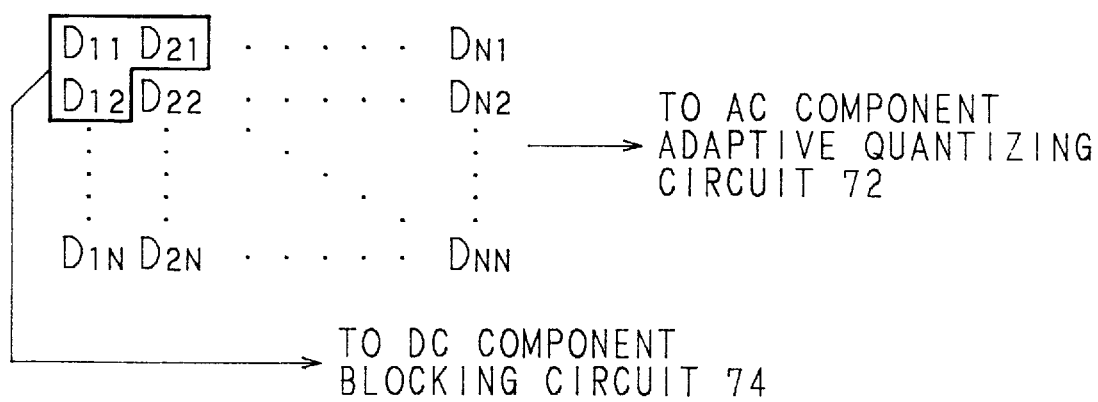
FIG. 40 is a diagram explaining the operation of an alternative video signal recording and reproducing apparatus according to the seventeenth embodiment of the invention.

In an alternative example, after orthogonal-transforming the input video signal, the resulting coefficients may be separated into low-frequency coefficients and coefficients other than the low-frequency ones as shown in FIG. 40; in this case, the coefficients other than the low-frequency ones are adaptively quantized, while the low-frequency coefficients are arranged into blocks according to the frequency level and each block is then orthogonal-transformed and adaptively quantized to accomplish the compression of the information amount. This example also accomplishes the same effect as described in the fourteenth embodiment.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A video signal recording and reproducing apparatus in which a digital video signal, representing an original image, is divided into a plurality of subband video signals, further arranged into blocks, wherein each block is orthogonally-transformed to obtain coefficients for encoding and recording encoded data on a recording medium, said apparatus comprising;

means for producing data specifically encoded for high-speed replay by encoding only a portion of the coefficients in each block of a low-frequency subband obtained from the subband division;

means for recording said encoded data, including all coefficients for normal replay, and said data encoded for high-speed replay, including only the portion of the coefficients for high-speed replay, in different areas on said recording medium; and means for reproducing the original image from only said encoded data.

2. A video signal recording and reproducing apparatus in which a digital video signal, representing an original image, is divided into blocks, wherein each block is orthogonally-transformed to obtain coefficients for encoding and recording encoded data on a recording medium, said apparatus comprising:

means for producing data specifically encoded for high-speed replay by encoding only a portion of the coefficients in each block;

means for recording said encoded data, including all coefficients for normal replay, and said data encoded for high-speed replay, including only the portion of the coefficients for high-speed replay, in different areas on said recording medium; and means for reproducing the original image from only said encoded data.

3. A video signal recording and reproducing apparatus comprising:

means for dividing an input digital video signal into blocks;

compressing means for compressing an amount of information by performing an orthogonal transform on each block;

constructing means for constructing an information word of a predetermined size from coefficients obtained by said compressing means; and appending means for appending a check word to the information word, wherein, when the amount of information of the coefficients for one block obtained from said compressing means is smaller than an allocated information amount for the one block, said constructing means selects, from the coefficients obtained by said compressing means, low-frequency coefficients from the one block having an information amount equivalent to a difference between the amount of information of the coefficients for the one block obtained from said compressing means and the allocated information amount for the one block, and constructs an information word of the predetermined size from the selected low-frequency coefficients of the one block plus the amount of information of the coefficients of the one block obtained from said compressing means.

4. The video signal recording and reproducing apparatus of claim 3, further comprising:

control means for controlling said constructing means such that said constructing means selects the low-frequency coefficients from a block in a center of a screen and moves through the blocks toward a periphery of the screen.

5. A video signal recording and reproducing apparatus comprising:

means for dividing an input digital video signal into blocks;

compressing means for compressing an amount of information by performing an orthogonal transform on each block;

means for separating coefficients obtained from said compressing means into, at least a first information sequence including low-frequency coefficients and a second information sequence including non-low-frequency coefficients; and appending means for appending check words such that said first information sequence has a greater minimum distance than said second information sequence.

6. The video signal recording and reproducing apparatus of claim 5, wherein said appending means includes:

means for constructing an information word of a predetermined size for each of said first information sequence and said second information sequence;

means for appending a first check word to each information word along a first direction; and means for appending a second check word to the information word for said first information sequence along a second direction.

7. The video signal recording and reproducing apparatus of claim 5, wherein said appending means includes:

means for constructing a first information word of a first predetermined size for said first information sequence;

means for appending a first check word to said first information word;

means for constructing a second information word of a second predetermined size for said second information sequence;

means for constructing a third information word by appending said second information word to said first information word having said first check word appended thereto; and means for appending a second check word to said third information word.

8. A video signal recording and reproducing apparatus in which an input video signal is divided into blocks, wherein each block is orthogonally-transformed to compress an amount of information, said apparatus comprising:

first compressing means for compressing the amount of information using an orthogonal transform after the input video signal is divided into blocks of a predetermined size to produce coefficients; and second compressing means for compressing only low frequency coefficients of the coefficients from said first compressing means using an orthogonal transform after the low-frequency of the coefficients obtained by said first compressing means, are arranged into blocks of a predetermined size.

9. The video signal recording and reproducing apparatus of claim 8, wherein said second compressing means only compresses DC component coefficients of the coefficients from said first compressing means.

10. A video signal recording and reproducing apparatus, comprising:

compressing means for compressing frequency components of a video signal; and comparing means for comparing an information amount of the frequency components of one block of the video signal with an information amount allocated to the one block of the video signal, and if the allocated information amount is greater than the information amount of the frequency components of the one block of the video signal, for further adding duplicate low frequency components of the one block of the video signal to a remainder of the information amount allocated to the one block of the video signal.

11. The video signal recording and reproducing apparatus of claim 10, wherein the added low frequency components of the video signal increase an error detection probability of the video signal.

12. The video signal recording and reproducing apparatus of claim 10, wherein the low frequency components of the video signal are included in the information amount twice.

13. The video signal recording and reproducing apparatus of claim 10, wherein the low frequency components of the video signal are added to the remainder of the information amount allocated to the video signal in an order in which the low frequency components of the video signal were orthogonally transformed.

14. The video signal recording and reproducing apparatus of claim 10, wherein low frequency components of the video signal located near a center of the video signal are added to the remainder of the information amount allocated to the video signal before low frequency components of the video signal located near a periphery of the video signal.

15. The video signal recording and reproducing apparatus of claim 10, wherein only DC components of the video signal are added to the remainder of the information amount allocated to the video signal.

16. The video signal recording and reproducing apparatus of claim 10, wherein only low frequency components located near a center of the video signal are added to the remainder of the information amount allocated to the video signal.

17. A video signal recording and reproducing apparatus, comprising:

blocking means for dividing a video signal into a plurality of blocks;

orthogonal transform means for orthogonally transforming each of the plurality of blocks into a plurality of coefficients;

quantizing means for adaptively quantizing the plurality of coefficients to produce a plurality of adaptive quantized coefficients and a plurality of adaptively quantized low frequency coefficients;

buffer means for storing the plurality of adaptively quantized low frequency coefficients;

error correction block generating means for generating an information word of a predetermined size from the plurality of adaptively quantized coefficients and if the plurality of adaptively quantized coefficients are less than the predetermined size, then sequentially filling the information word with duplicates of the plurality of adaptively quantized low frequency coefficients from said buffer means to complete the information word; and error correction means for performing error correction on the information word in a column direction and a row direction and appending a column check word and a row check word to the information word.

18. The video signal recording and reproducing apparatus of claim 17, wherein the plurality of adaptively quantized low frequency coefficients increase an error detection probability of the video signal.

19. The video signal recording and reproducing apparatus of claim 17, wherein the plurality of adaptively quantized low frequency coefficients are included in the information word twice.

20. The video signal recording and reproducing apparatus of claim 17, wherein the plurality of adaptively quantized low frequency coefficients sequentially fill the information word in an order in which the plurality of adaptively quantized low frequency coefficients were orthogonally transformed.

21. The video signal recording and reproducing apparatus of claim 17, wherein the plurality of adaptively quantized low frequency coefficients located near a center of the video signal sequentially fill the information word before the plurality of adaptively quantized low frequency coefficients located near a periphery of the video signal.

22. The video signal recording and reproducing apparatus of claim 17, wherein only DC coefficients sequentially fill the information word.

23. The video signal recording and reproducing apparatus of claim 17, wherein only the plurality of adaptively quantized low frequency coefficients located near a center of the video signal sequentially fill the information word.

24. The video signal recording and reproducing apparatus of claim 17, further comprising buffer control means for controlling said buffer means so that only the plurality of adaptively quantized low frequency coefficients are stored in said buffer means.

25. A video signal recording and reproducing apparatus, comprising:
- blocking means for dividing a video signal into a plurality of blocks;
- orthogonal transform means for orthogonally transforming each of the plurality of blocks into a plurality of AC coefficients and a plurality of DC coefficients;
- quantizing means for adaptively quantizing the plurality of AC coefficients;
- DC blocking means for arranging the plurality of DC coefficients into a plurality of DC blocks;
- DC component orthogonal transform means for orthogonally transforming each of the plurality of DC blocks into a plurality of coefficients;
- DC quantizing means for adaptively quantizing the plurality of DC coefficients based on an AC component power value of a corresponding one of the plurality of AC coefficients;
- error correction block generating means for generating an information word of a predetermined size from the plurality of adaptive quantized AC coefficients from said quantizing means and the plurality of adaptive quantized DC coefficients from said DC quantizing means.

26. A video signal recording and reproducing apparatus in which a digital video signal is divided into blocks, each block being orthogonal-transformed to obtain coefficients for encoding and recorded as encoded data on a recording medium, said apparatus comprising:
- means for obtaining, from said encoded data, data specifically encoded for high-speed replay which is produced by encoding only a portion of the coefficients in each block, and
- means for recording said encoded data, including all coefficients for normal replay, in end portions of a plurality of tracks of said recording medium and said data encoded specifically for high-speed replay, including only the portion of the coefficients for high-speed replay, in central portions of the plurality of tracks of said recording medium.

* * * * *